US009476385B2

(12) United States Patent
Moore et al.

(10) Patent No.: US 9,476,385 B2
(45) Date of Patent: Oct. 25, 2016

(54) ROTATIONAL ANNULAR AIRSCREW WITH INTEGRATED ACOUSTIC ARRESTER

(71) Applicant: The Boeing Company, Chicago, IL (US)

(72) Inventors: Matthew D. Moore, Everett, WA (US); Kelly L. Boren, Marysville, WA (US)

(73) Assignee: The Boeing Company, Chicago, IL (US)

( * ) Notice: Subject to any disclaimer, the term of this patent is extended or adjusted under 35 U.S.C. 154(b) by 933 days.

(21) Appl. No.: 13/674,377

(22) Filed: Nov. 12, 2012

(65) Prior Publication Data
US 2015/0000252 A1    Jan. 1, 2015

(51) Int. Cl.
*F02K 5/00* (2006.01)
*F01D 1/24* (2006.01)
*F04D 29/32* (2006.01)
*F02K 1/44* (2006.01)
(Continued)

(52) U.S. Cl.
CPC ............... *F02K 5/00* (2013.01); *B64C 11/001* (2013.01); *B64C 11/18* (2013.01); *F01D 1/24* (2013.01); *F02K 1/44* (2013.01); *F04D 29/326* (2013.01); *Y10T 137/0536* (2015.04)

(58) Field of Classification Search
CPC ............ F01D 5/141; F01D 1/24; F01D 1/26; F04D 29/664; F04D 29/326; F04D 29/327; F05D 2260/96; F05D 2240/301; F02C 3/067; F02K 3/072; F02K 1/44; F02K 5/00; B64C 11/48; B64C 11/18; B64C 11/01; B63H 5/10; B63H 2005/106; B63H 23/24
USPC ......................................................... 416/129
See application file for complete search history.

(56) References Cited

U.S. PATENT DOCUMENTS 2,425,904 A * 8/1947 Vernon ................... F02K 7/005
                                                                 244/53 R
2,870,847 A   1/1959 Fry
3,101,917 A   8/1963 Sudrow
(Continued)

FOREIGN PATENT DOCUMENTS

EP    2841669 A2   8/2012
GB    2468917 A    9/2010

OTHER PUBLICATIONS

Office Action issued in Canadian Patent Application No. 2,834,390 dated Dec. 17, 2014.
(Continued)

*Primary Examiner* — Craig Kim
*Assistant Examiner* — Brian P Wolcott
(74) *Attorney, Agent, or Firm* — McDonnell Boehnen Hulbert & Berghoff LLP

(57) ABSTRACT

A propulsion system and methods are presented. A substantially tubular structure comprises a central axis through a longitudinal geometric center, and a first fan rotates around the central axis, and comprises a first fan hub and first fan blades. The fan hub is rotationally coupled to the substantially tubular structure, and the first fan blades are coupled to the first fan hub and increase in chord length with increasing distance from the first fan hub. A second fan is rotationally coupled to the substantially tubular structure and rotates around the central axis and contra-rotates relative to the first fan. Second fan blades are coupled to the second fan hub, and a nacelle circumscribing the first fan and the second fan is coupled to and rotates with the first fan.

37 Claims, 13 Drawing Sheets

(51) Int. Cl.
*B64C 11/00* (2006.01)
*B64C 11/18* (2006.01)

(56) References Cited

U.S. PATENT DOCUMENTS 3,890,060 A * 6/1975 Lipstein ................ F04D 29/664
  181/214
4,063,852 A * 12/1977 O'Connor ............... F01D 5/141
  416/223 R
4,767,270 A * 8/1988 Seidel ................... B64C 11/001
  416/129
6,856,941 B2 * 2/2005 Bradbury .............. F04D 29/384
  702/182

OTHER PUBLICATIONS

Office Action issued in Canadian Patent Application No. 2,834,390 dated Oct. 26, 2015.

* cited by examiner

DIRECTION OF FLIGHT
142

ROTATIONAL ANNULAR AIRSCREW WITH INTEGRATED ACOUSTIC ARRESTER

FIELD

Embodiments of the present disclosure relate generally to propulsion systems, and more particularly relate to ducted contra-rotating fans.

BACKGROUND

Two engines producing a same thrust as a single equivalent engine are generally heavier, have more drag and nearly double maintenance. As engine efficiency and performance technology plateaus in a presence of increasing range, improved operating economics, and more stringent noise requirements, greater emphasis may be placed on designing single engine aircraft. This has become more compelling as engines have also advanced to become more reliable and a corresponding likelihood of non-optimal aircraft operation in-service due to single engine anomaly decreases.

While these principles are changing for designs of many types of aircraft, these principles are especially changing for smaller aircraft such as Unmanned Arial Vehicles (UAV's), where weight and balance sensitivities can be much greater than for larger aircraft due to relative differences in mass ratios between vehicle, fuel, propulsion system and payload. Accordingly, current art for small UAV's reflect significant usage of designs with single engine propulsion systems utilizing un-shrouded propellers to maximize efficiency and flight time. However, propellers are noisy, and are not easily modified to meet more stringent noise requirements. Increasing a propeller diameter to decrease noise creates complex integration challenges that can require radical changes in vehicle design. Furthermore, propellers may have difficulty in achieving sufficiently low noise levels due to difficulties imposed on a vehicle by having to increase propeller diameter to reduce noise, and where on the vehicle a large diameter propeller has to be installed. For example, an increase propeller diameter can create adverse installation effects which counter-act noise reduction from the increased diameter.

SUMMARY

A propulsion system and methods are presented. A substantially tubular structure comprises a central axis through a longitudinal geometric center, and a first fan rotates around the central axis, and comprises a first fan hub and first fan blades. The first fan hub is rotationally coupled to the substantially tubular structure (e.g., a fuselage), and the first fan blades are coupled to the first fan hub and increase in first fan blade chord length with increasing distance from the first fan hub. A second fan is rotationally coupled to the substantially tubular structure and rotates around the central axis and contra-rotates relative to the first fan. Second fan blades are coupled to the second fan hub, and a nacelle circumscribing the first fan and the second fan is coupled to and rotates with the first fan.

In an embodiment, a propulsion system comprises a substantially tubular structure, a first (fwd) fan, a second (aft) fan, and a nacelle. The substantially tubular structure comprises a central axis through a longitudinal geometric center, and the first fan is configured to rotate around the central axis and comprises a first fan hub and first fan blades. The first fan hub is rotationally coupled to the substantially tubular structure, and the first fan blades are coupled to the first fan hub and increase in chord length with increasing distance from the first fan hub. The second fan is rotationally coupled to the substantially tubular structure and rotates around the central axis and contra-rotates relative to the first fan. Second fan blades are coupled to the second fan hub. The nacelle circumscribes the first fan and the second fan, and is coupled to and rotates with the first fan.

In another embodiment, a method for configuring a propulsion system rotationally couples a first fan to a substantially tubular fuselage comprising a central axis through a longitudinal geometric center the substantially tubular fuselage. The first fan comprises first fan blades coupled to a first fan hub and increasing in chord length with increasing distance from the first fan hub. The method further configures the first fan to rotate around the central axis, and rotationally couples a second fan to the substantially tubular fuselage. The method further configures the second fan comprising second fan blades to rotate around the central axis and contra-rotate relative to the first fan, and configures a nacelle to circumscribe the first fan and the second fan. The method further couples the nacelle to the first fan, and configures the nacelle to rotate with the first fan.

In a further embodiment, a method for operating a propulsion system rotates a first fan to around a central axis of a substantially tubular fuselage. The first fan comprises a plurality of fan blades coupled to a first fan hub and increases in chord length with increasing distance from the first fan hub. The method further contra-rotates a second fan relative to the first fan and around the central axis, and rotates a nacelle coupled to the first fan with the first fan while circumscribing the first fan and the second fan.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION

Figure 1:
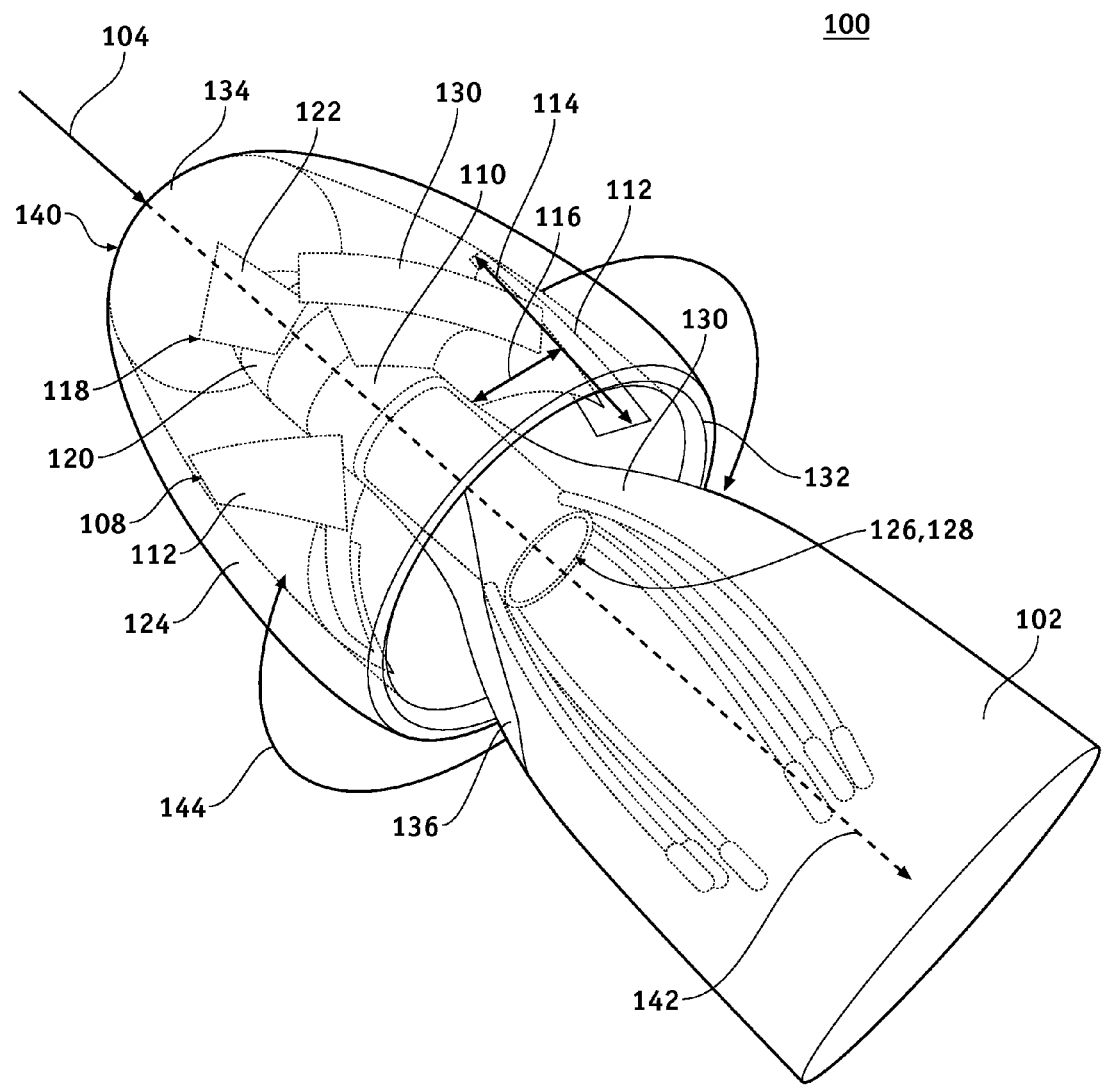
FIG. 1 is an illustration of an exemplary perspective view of an exemplary rotational annular airscrew with an integrated fuselage acoustic arrester according to an embodiment of the disclosure.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A ducted fan propulsion system can be integrated into a single engine powered aircraft efficiently and elegantly. Thereby, thrust producing propulsion components such as a fan or fans see axial and substantially efficient inlet flow via an annular inlet, and thrust-drag vectors are substantially aligned (e.g., two coincident vectors in parallel having a same origin). A motor or power drive system can be located within a primary air vehicle payload structure while driving a thrust producing shrouded fan or system of shrouded fans that are mounted external to the primary air vehicle payload structure.

A ducted fan uses mechanical energy from an engine to accelerate air rearwards in a direction opposite to flight. Ducted fans are generally a most efficient propulsion method in a range of speeds from about Mach 0.76 to about Mach 0.86 at which substantially most commercial aircraft operate. Transonic and Supersonic aircraft may generally fly much faster (e.g., Concorde at Mach 2.0). Increases in stringent community noise certification regulations and workplace noise exposure regulations affect allowable aircraft cabin noise and increasingly pose significant challenges to advanced propulsion design. Furthermore, noise prevents low observability of, for example, Unmanned Aerial Vehicles (UAVs) that may be very important in accomplishing certain missions. It is generally preferred for a UAV to not be heard before arrival at a destination because half of an observation duration may be consumed if silent before arrival.

Some embodiments of the disclosure may comprise a single rotation, or a single fan ducted thrust producing fan system. Some embodiments of the disclosure comprise contra-rotating ducted fan thrust producing modules comprising a higher efficiency at some fan pressure ratios than single fans. Embodiments of contra-rotating ducted fan thrust producing modules can comprise an ability to tailor individual relative fan disc/blade speeds for mission needs when driven by electric motors, which would generally be infeasible with a gas generator combustion based contra turbofan.

FIG. 1 is an illustration of an exemplary perspective view of an exemplary rotational annular airscrew 140 with an integrated fuselage closeout acoustic arrester 136 (acoustic arrester 136) according to an embodiment of the disclosure. The rotational annular airscrew 140 with an acoustic arrester such as the fuselage closeout acoustic arrester 136 is referred to as the propulsion system 100. The propulsion system 100 comprises a substantially tubular structure 102, a forward fan 108, an aft fan 118, a rotational nacelle 124 (rotating nacelle 124), a contra-rotating forward coaxial electric motor 126, a contra-rotating aft coaxial electric motor 128, and a substantially conical close-out end 130 (aft-body closeout 130) comprising an acoustic foam/lining 136 (acoustic arrester 136). Generally, the propulsion system 100 provides the rotational nacelle 124 circumscribing the (electric contra-rotating) forward fan 108 and the aft fan 118 mounted behind a tubular vehicle structure such as the substantially tubular structure 102 with the acoustic foam/lining 136 placed on the substantially conical close-out end 130.

Substantially conical close-out end 130, aft-fuselage closeout 130, aft-body closeout 130, and conical close-out end 130, may be used interchangeably in this document. Also, integrated conical fuselage closeout acoustic arrester 136, integrated fuselage closeout acoustic arrester 136, integrated conical acoustic arrester 136, fuselage closeout acoustic arrester 136, fuselage closeout acoustic arrester 136, acoustic arrester 136, acoustic foam/lining 136, lining 136, acoustic foam 136, acoustic cover 136, and acoustic lining 136 may be used interchangeably in this document.

The substantially tubular structure 102 comprises a central axis 104 comprising a longitudinal geometric center of the substantially tubular structure 102. The substantially tubular structure 102 may comprise, for example, a fuselage, and other tubular structure. The substantially tubular structure 102 may further comprise a conical or semi conical shape, e.g., at an end close out such as the substantially conical close-out end 130. The substantially tubular structure 102 may move in a direction of flight 142.

Figure 5:
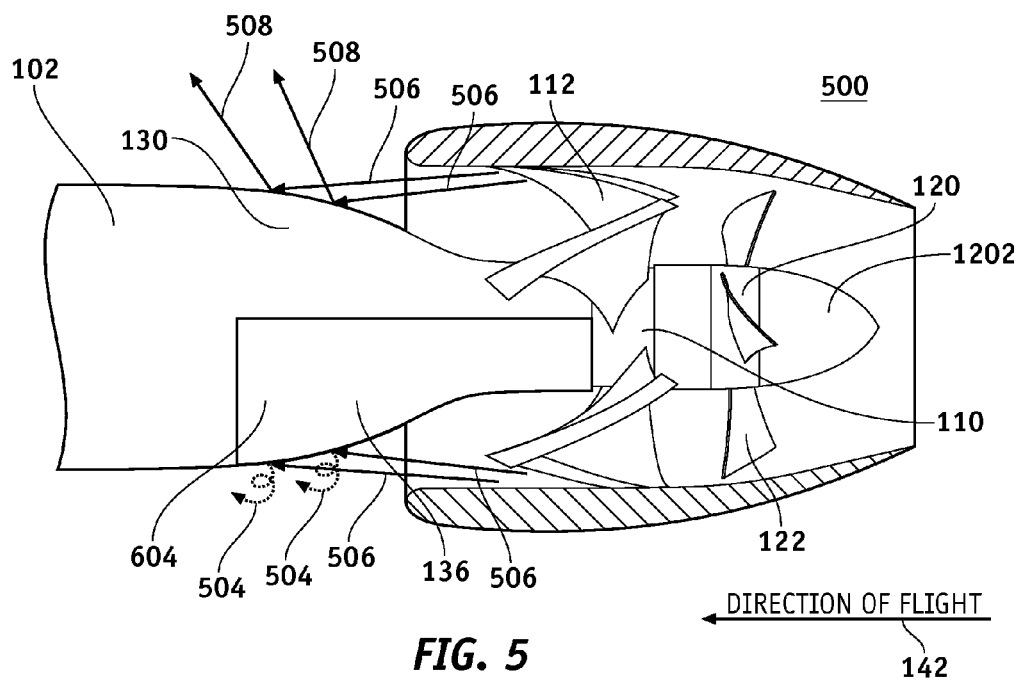
FIG. 5 is an illustration of a cross sectional view of an exemplary rotational annular airscrew with integrated conical acoustic arrester showing an application of an acoustic coverage on a lower portion of an aft-fuselage closeout according to an embodiment of the disclosure.

Embodiments of the disclosure provide the substantially tubular structure 102 (fuselage) in a coaxial common arrangement with an engine center line to provide acoustic attenuation. In this arrangement, a fuselage can serve an aerodynamic function as a centerbody. An outer surface of the fuselage centerbody provides acoustic attenuation by a curvature of the aft-body closeout 130 configured such that acoustic radiation/rays 508 bounces backwards or to a side as shown in FIG. 5.

Embodiments of the disclosure also provide for high speed operation. For example, supersonic flight up to moderate supersonic speeds is feasible with a fixed inlet and nozzle geometry. Efficient supersonic flight, even at low to moderate supersonic flight speeds may be a highly attractive enabler for small vehicles with specialized mission requirements. A rotating shroud is not limited to but may be a fixed geometry, and flight at speeds up to Mach 1.2 or beyond can be facilitated with an external compression inlet and a fixed convergent-divergent nozzle. According to embodiments of the disclosure, these features may be incorporated into an integrated propulsive fan and a rotating nacelle behind a tubular air vehicle structure. For a relative rotational speed of a nacelle to forward flight and internal air speeds anticipated for smaller size vehicles, the rotating nacelle 124 may not impart a substantial momentum on an airflow.

Many external compression inlets may require some degree of inlet rounding for low-speed operation (e.g., the bell-mouth effect) especially in a presence of a cross wind. An advantageous benefit of embodiments comprising a fuselage-like structure such as the substantially tubular structure 102 upstream of an inlet is that near an inlet opening, the inlet serves a function of an aerodynamic bullet or inlet forebody such as in a mixed compression supersonic inlet. Accordingly, the aerodynamic bullet will tend to smooth an inflow into a sharp inlet leading edge, even in a cross wind.

According to embodiments of the disclosure, the rotational nacelle 124 is physically fixed to one of the forward fan 108 and the aft fan 118. Being physically fixed to one of the forward fan 108 and the aft fan 118 can negate a need for struts or pylons being attached to the fuselage 130. Being physically fixed to one of the forward fan 108 and the aft fan 118 is feasible using low mass high performance plastics, composites, or other lightweight materials for the forward fan blades 112, aft fan blades 122, and the rotational nacelle 124.

The forward fan 108 is configured to rotate around the central axis 104 and comprises a forward fan hub 110 and a plurality of forward fan blades 112. The forward fan 108 may be physically fixed (connected) to the rotational nacelle 124. The forward fan 108 comprises a stationary or a rotating operating configuration to optimize performance and external noise at different flight speeds. The forward fan hub 110 is rotationally coupled to the substantially tubular structure 102 (fuselage), and the forward fan blades 112 are coupled to the forward fan hub 110. A chord length 114 (fan blade chord length) of the forward fan blades 112 increases in chord length 114 with a distance 116 from the forward fan hub 110 (also see FIGS. 2 and 3). In some embodiments, the fan blade chord length 114 of the forward fan blades 112 is about twice a length of a fan blade chord length of the aft fan blades 122.

The aft fan 118 is configured to rotate around the central axis 104 and contra-rotate relative to the forward fan 108 and comprises an aft fan hub 120 and a plurality of the aft fan blades 122. The aft fan 118 may be physically fixed (connected) to the rotational nacelle 124. In some embodiments, the fan blade chord length of the aft fan blades 122 is about twice a length of the fan blade chord length 114 of the forward fan blades 112. The aft fan hub 120 is rotationally coupled to the substantially tubular structure 102 (fuselage), and the aft fan blades 122 are coupled to the aft fan hub 120. The forward fan 108 may have a substantially different rotational speed relative to the aft fan 118.

The rotational nacelle 124 circumscribes the forward fan 108 and the aft fan 118, and is coupled (physically fixed/connected) to and configured to rotate with one of the forward fan 108 and aft fan 118. The rotational nacelle 124 comprises an annular forward inlet such as the inlet 132 and a cylindrical outlet 134 aft. Affixing the rotational nacelle 124 to the forward fan 108 enables greater efficiency by elimination of a tip gap between the forward fan blades 112 of the forward fan 108 and the rotational nacelle 124. A tip gap can degrade efficiency. Furthermore, affixing the rotational nacelle 124 to the forward fan 108 enables the forward fan 108 to comprise a wide (increased) fan blade chord 114 (airfoil chord) near the rotational nacelle 124 (blade tip) to increase a local coefficient of lift and draw in more air. For an existing free-spinning fan blade within a non-rotating fixed nacelle, added fan blade chord (airfoil chord) near a blade tip may not generally be feasible due to fan-flutter and strength issues. Furthermore, the rotational nacelle 124 enables greater rotating inertia than free-spinning fan disks of existing systems, thereby providing greater yaw and pitch stability and requiring less gust control authority, which may enable smaller yaw and pitch control surfaces.

Additionally, affixing the rotational nacelle 124 to a rotating fan such as the forward fan 112 substantially replaces a need for fixed attachment points to an aft fuselage that would otherwise create drag, add weight, and create fan inflow turbulence that would cause noise. Also, the rotational nacelle 124 facilitates a use of one or more acoustic arrester comprising acoustic bulk absorber materials that absorb noise produced by the fan blades 112/122, thereby reducing acoustic detectability of the rotational nacelle 124.

The contra-rotating forward coaxial electric motor 126 and the contra-rotating aft coaxial motor 128 are coupled to each other and are operable to be controllable individually, and to contra-rotate relative to each other as explained in more detail below in the context of discussion of FIG. 13. A contra-rotation fan module driven by electric power allows relative tip speeds of aft fan blades 122 and the forward fan blades 112 of the aft fan 118 and the forward fan 108 to be continuously optimized for noise, performance, or an optimal compromise of both. The forward fan 108 and the aft fan 118 can be driven by two independently operating and controlled contra-rotating motors such as the forward coaxial electric motor 126 and the contra-rotating aft coaxial electric motor 128.

UAV missions generally entail multiple segments including launch/transit, loiter, and return. Existing designs operate at essentially one speed throughout a mission, with exception of deceleration prior to landing or capture. In contrast to the existing designs, the propulsion system 100 is configured to vary a flight speed as needed for various segments of flight as explained in more detail below in the context of discussion of FIG. 16.

The contra-rotating forward coaxial electric motor 126 and the contra-rotating aft coaxial electric motor 128 are coupled to at least one energy source. The contra-rotating forward coaxial electric motor 126 and the contra-rotating aft coaxial electric motor 128 may be directly coupled to the at least one energy source, or through various control and/or power distribution circuits. The energy source may comprise, for example, a system to convert chemical, solar or nuclear energy into electricity within or coupled to a volume bearing structure. The energy source may comprise, for example but without limitation, a battery, a fuel cell, a solar cell, an energy harvesting device, low energy nuclear reactor (LENR), a hybrid propulsion system, or other energy source.

The forward fan blades 112 and the aft fan blades 122 are coupled to the contra-rotating forward coaxial electric motor 126 and the contra-rotating aft coaxial electric motor 128 respectively. A contra-rotating fan such as the forward fan 108 and the aft fan 118 enable the rotational nacelle 124 to be physically fixed to one of the forward fan 108 and the aft fan 118 (rotating fan stages). This substantially replaces a need for struts or pylons being attached to a fuselage such as the substantially tubular structure 102. Also, making the forward fan blades 112 of the forward fan 108, the aft fan blades 122 of the aft fan 118, and the rotational nacelle 124 comprise a low mass is feasible via use of high performance plastics.

At low flight speeds typical for a UAV, usage of an existing offset or s-duct inlet requires a very long inlet in order for a fan face to have sufficient uniformity to produce efficient thrust. In some embodiments, the propulsion system 100 may be used with a gas-turbine engine, e.g., by locating an electric generator/core engine away from and vented away from the contra-rotating forward coaxial electric motor 126 and the contra-rotating aft coaxial electric motor 128 of the propulsion system 100. Thereby, the propulsion system 100 can sufficiently vent and route hot exhaust gasses of combustion of a gas-generator/core engine away from the annular forward inlet 132 of the propulsion system 100.

The substantially conical close-out end 130 of the substantially tubular structure 102 is coupled to the contra-rotating forward coaxial electric motor 126 and may comprise the acoustic foam/lining 136.

The acoustic arrester/foam/lining/coating 136 comprises an acoustic attenuating material such as, but without limitation, a polyurethane foam, a polyether foam, a polyester foam, a melamine foam, or other acoustic attenuating material. For example, in the embodiment shown in FIG. 1, the acoustic attenuating material is coated on a downward and sideward looking portion of a narrowing length of the substantially conical close-out 130 forming the acoustic arrester 136 of the substantially tubular fuselage 102. For another example, an entire narrowing length of the substantially conical close-out end 130 of the substantially tubular fuselage 102 may be coated with the acoustic attenuating coating.

Figure 2:
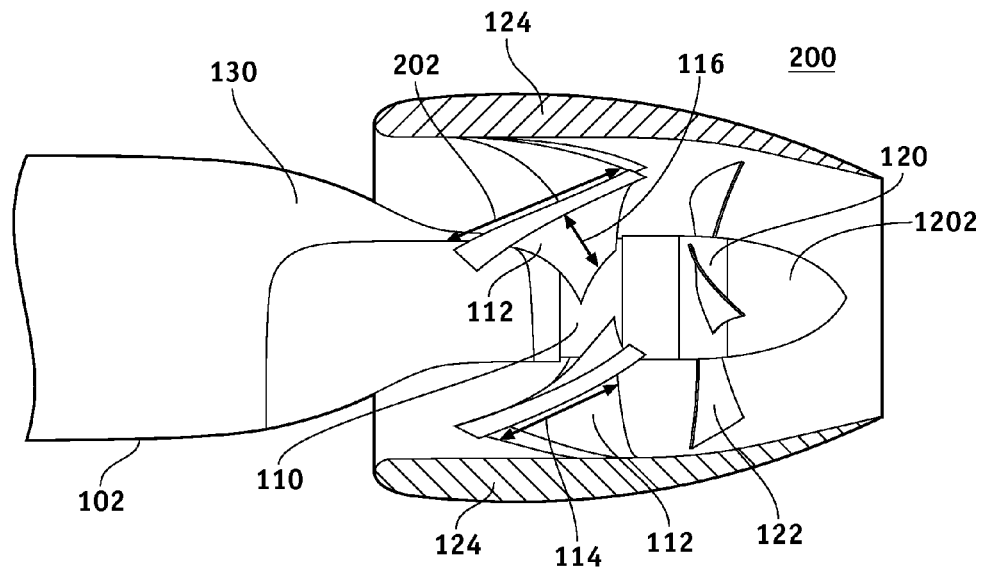
FIG. 2 is an illustration of a cross sectional view of an exemplary rotational annular airscrew with integrated conical acoustic arrester showing an ultra-wide-chord fan tip coupled to a rotational nacelle according to an embodiment of the disclosure.

The propulsion system 100 may also use other acoustic arresters such as, but with limitation, an acoustic lining 702 (FIG. 7) and a conical closeout plug acoustic arrester 1202 as shown in FIG. 2 below. An acoustic arrester such as, but with limitation, the acoustic arrester/foam/lining/coating 136, the acoustic lining 702, and the conical closeout plug acoustic arrester 1202 may be formed in any size, design, or shape suitable for operation of the propulsion system 100. As such, the acoustic arresters shown in the figures herein may not necessarily be made to scale.

FIG. 2 is an illustration of a cross sectional view 200 of the exemplary propulsion system 100 showing the forward fan blades 112 comprising an ultra-wide fan-blade tip chord 202 coupled to the rotational nacelle 124 according to an embodiment of the disclosure. As mentioned above, the chord length 114 (fan blade chord length) of the forward fan blades 112 increases in the chord length 114 with a distance 116 from the forward fan hub 110.

The fan-blade tip chord 202 of the forward fan blade 112 is affixed to the rotational nacelle 124. Increasing the fan-blade tip chord 202 greatly improves an amount of flow produced by the forward fan 108, and smooths and quiets a transition of air flow by reducing a flow separation over a larger range of a fan tip speeds. However, for existing fan blades not fixed to a nacelle, fan tip chord is often limited by flutter, e.g., as a chord grows, an existing fan blade may become structurally compromised due to increased susceptibility to fan flutter. By having essentially a single piece fan blade and nacelle such as the forward fan blade 112 and the rotational nacelle 124, the fan-blade tip chord 202 can be greatly enlarged allowing a significant increase in fan flow with reduced noise compared to existing non-rotating nacelle systems.

A conical closeout plug acoustic arrester 1202 may be coupled to the aft fan hub 120. The conical closeout plug acoustic arrester 1202 comprises a noise absorbing material, for example but without limitation, a polyurethane foam, a polyether foam, a polyester foam, a melamine foam, or other acoustic attenuating material.

Figure 3:
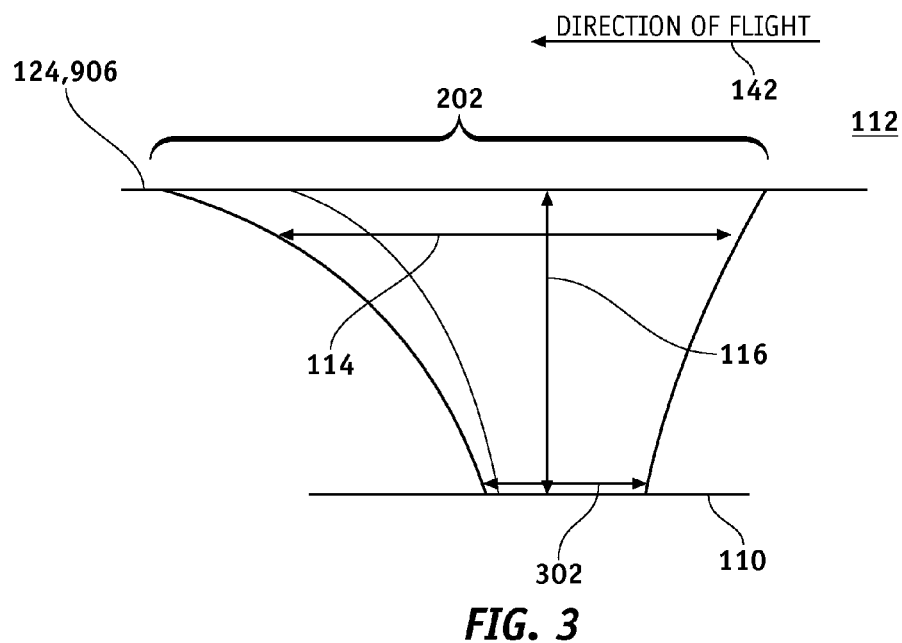
FIG. 3 is an illustration of a cross sectional view of an exemplary ultrawide-chord fan tip that can be coupled to a rotational nacelle according to an embodiment of the disclosure.

FIG. 3 is an illustration of an exemplary forward fan blade 112 comprising an ultra-wide fan-blade tip such as the fan-blade tip chord 202 that can be coupled to the rotational nacelle 124 according to an embodiment of the disclosure.

The forward fan blade 112 increases in the chord length 114 from the root chord 302 to the fan-blade tip chord 202. The forward fan blade 112 may comprise, for example but without limitation, the fan-blade tip chord 202 of the forward fan blades 112 about 50% larger than a root chord 302 of the forward fan blades 112, or other ratio suitable for operation of the system 100. FIG. 3 is provided to facilitate understanding of an ultra-wide fan-blade and the forward fan blade 112 and is not necessarily made to scale. The fan-blade tip chord 202 may comprise the blade chord 114 at or near the rotational nacelle 124/906. The fan-blade tip chord 202 at or near the rotational nacelle 124 may be a different size than the fan-blade tip chord 202 at or near the rotational nacelle 906.

Figure 4:
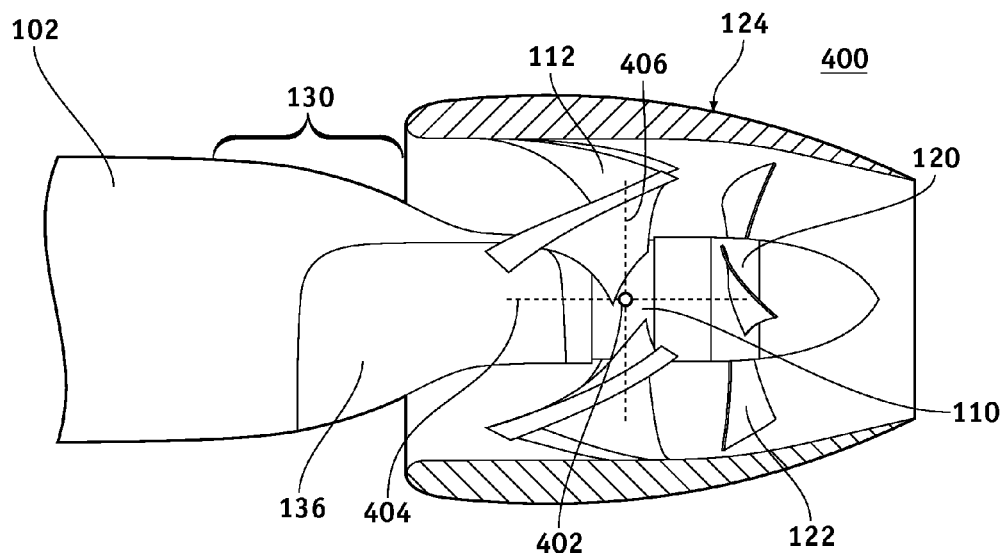
FIG. 4 is an illustration of a cross sectional view of an exemplary rotational annular airscrew with integrated conical acoustic arrester showing a center of gravity of a rotational nacelle according to an embodiment of the disclosure.

FIG. 4 is an illustration of a cross sectional view 400 of the exemplary propulsion system 100 shown in FIG. 1 showing a center-of-gravity 402 of the rotational nacelle 124 according to an embodiment of the disclosure. In one embodiment, the rotational nacelle 124 is affixed to the forward/upstream fan blades 112. While the rotational nacelle 124 may weigh, for example but without limitation, a few ounces, Configuring the center-of-gravity 402 of the rotational nacelle 124 as close to a center of the forward/upstream fan blades 112 bearing as possible may prevent rotating imbalance. Accordingly, as shown, the forward/upstream fan blades 112 are shown to have, e.g., a clockwise rotating direction 144 in FIG. 1 (e.g., if viewed from the front) with the rotational nacelle 124 rotating with the forward/upstream fan blades 112. The aft/downstream fan blades 122 rotate in an opposite direction to the forward/upstream fan blades 112, e.g., in a counter-clock-wise direction.

Due to a low mass involved, there may not be a direction of rotational preference. For example, the forward/upstream fan blades 112 and aft/downstream fans 122 could rotate in opposite respective directions if preferred for commercial "Off the Shelf" considerations, or if perhaps sufficient hemispheric specific Coriolis effects warranted.

FIG. 5 is an illustration of a cross sectional view of the exemplary propulsion system 100 of FIG. 1 showing an application of the acoustic lining 136 on a lower portion of the conical close-out end 130 according to an embodiment of the disclosure. The acoustic lining 136 comprises an acoustic attenuating coating of an acoustic absorptive material. Untreated acoustic rays 508 of acoustic radiations 506 are deadened (attenuated) as shown by dotted spiral arrows showing deadened rays 504 (attenuated rays) upon impact with the acoustic absorptive material of the acoustic lining 136, thereby noise is reduce.

A region such as the fuselage acoustic arrester 136 of the aft body closeout 130 may comprise acoustically soft materials to increase an acoustic reduction effect. The fuselage acoustic arrester 136 may comprise, for example but without limitation, a recessed tray for acoustically absorbent foam, a reserved section of the fuselage 102 made from naturally porous and acoustically absorbent foam, or other configuration. Since the aft body closeout 130 may not have to support a significant load, the aft body closeout 130 may comprise, for example, a primarily acoustically broadband absorbent material.

An important factor in cost containment however may be placement of an acoustically absorbent surface. With a rearward contracting taper of an aft fuselage such as the aft body closeout 130, an acoustically soft region such as the fuselage acoustic arrester 136 need be positioned only sufficiently forward to a point at which the aft body closeout 130 of the substantially tubular structure 102 becomes substantially a constant cross section or a point at which sound radiation would no longer be radiated aft or sideways due to geometric principle. Acoustic rays need only be attenuated if acoustic rays bounce off of a surface laterally, downwardly, or rearwardly in such a way as to be audible to an observer located in a place of concern.

An acoustically hard aft-body may bounce rays in directions where they could be observed provided they hit a surface with any incidence angle greater than 0 (parallel) degrees. If a surface comprises a bounce that has an incidence angle between source and receiver of greater than 0 degrees, the surface may need to be acoustically soft. However, bank angle may need to be considered as explained in more detail below.

Figure 6:
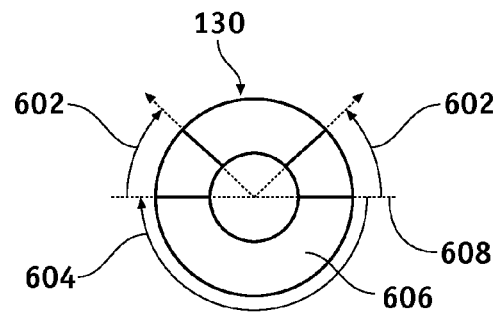
FIG. 6 is an illustration of a 2-D aft-looking forward view of an aft-fuselage closeout showing an aft-fuselage closeout acoustic lining coverage according to an embodiment of the disclosure.

FIG. 6 is an illustration of a 2 dimensional (2-D) aft-looking forward view 600 of the aft-fuselage closeout 130 showing an aft-fuselage closeout acoustic lining 602/604 coverage according to an embodiment of the disclosure. Bank angle may be considered when designing the aft-fuselage closeout acoustic lining 602/604 in that a UAV (e.g., UAV 1400A in FIG. 14) may embark upon a circular or elliptical orbit (e.g., FIG. 16 segment 1604) about a point of interest. A vehicle such as the UAV 1400A may adopt a roll or bank angle such that the acoustic rays 506 bounce off of a surface above a waterline (e.g., a line 608) of the UAV 1400A toward an observer. The waterline is a common term of art describing a geometric horizon of a body. If a body rotates in a banking turn, or lists to one side, its waterline changes with it.

Embodiments of the disclosure provide a maximum design bank angle for an acoustic observability requirement or community noise limit environment, and can be used to discern where the aft-body closeout 130 should be acoustically soft. For example, the aft-fuselage closeout 130 comprises the acoustic lining 604 that circumscribes at least 180 degrees of a lower hemisphere 606 of the substantially tubular structure 102 at least up to the line 608. In addition, the acoustic lining 602 circumscribes an additional angular increment above the lower hemisphere 606 that corresponds to a substantially maximum anticipated bank angle above the line 608.

Figure 7:
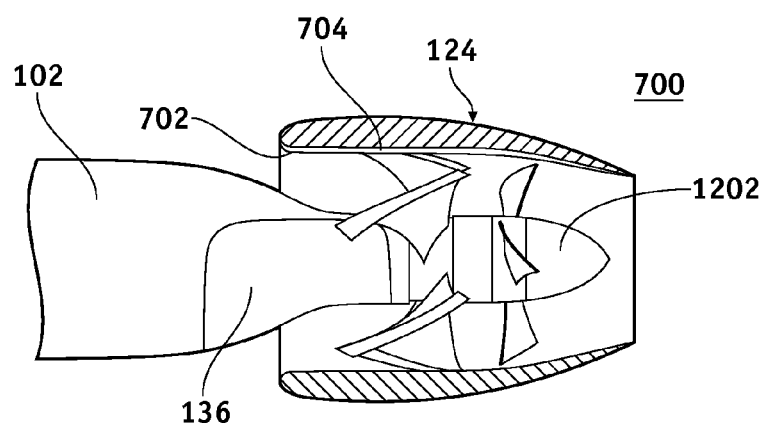
FIG. 7 is an illustration of a cross sectional view of an exemplary rotational annular airscrew with integrated conical acoustic arrester showing an application of an acoustic lining to cover an inner aerodynamic surface of the rotational nacelle according to an embodiment of the disclosure.

FIG. 7 is an illustration of a cross sectional view 700 of an exemplary propulsion system 100 of FIG. 1 showing an application of an acoustic lining 702 to cover an inner aerodynamic surface (inner model line, not shown) of the rotational nacelle 124 according to an embodiment of the disclosure. The acoustic lining 702 also covers a region 704 between the forward fan blades 112 fixed to the rotational nacelle 124. The acoustic lining 702 may cover an entire inner aerodynamic surface of the rotational nacelle 124. The acoustic lining 702 comprises an acoustic attenuating material such as, but without limitation, a polyurethane foam, a polyether foam, a polyester foam, a melamine foam, or other acoustic attenuating material.

Figure 8:
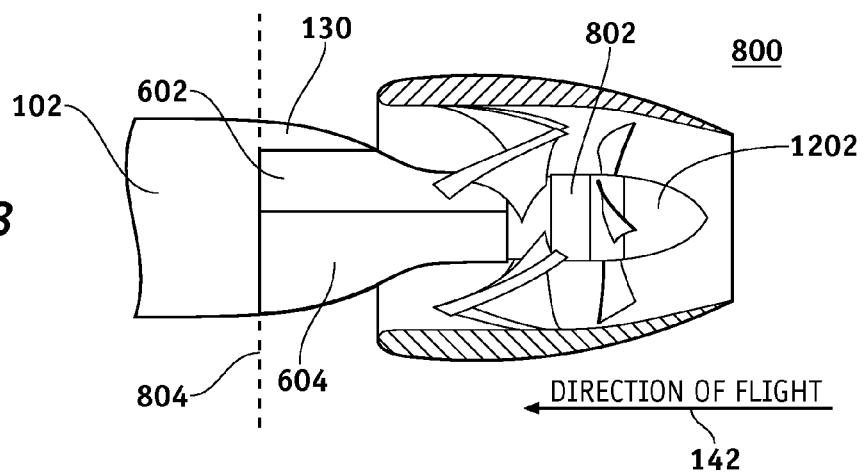
FIG. 8 is an illustration of a cross sectional view of an exemplary rotational annular airscrew with integrated conical acoustic arrester showing an application of additional acoustic coverage for bank angles according to an embodiment of the disclosure.

FIG. 8 is an illustration of a cross sectional view 800 of the propulsion system 100 showing an application of additional acoustic coverage 602 for bank angles according to an embodiment of the disclosure. "Off the shelf" electric contra rotation motors may provide high specific thrust and low specific energy usage in many thrust classes. By mounting an engine as shown in FIG. 1, both of the fans 108/118 can be mounted external to the aft-fuselage closeout 130. Additionally, 3D printing and other rapid prototyping methods and materials can be used that enable an entire nacelle weight to be lightweight. With an insignificant cantilevered weight aft of the fuselage 102, the rotational nacelle 124 need not be affixed to a fuselage, thereby rendering unnecessary struts that rob performance and create inflow distortion that aggravates noise.

Thus, the rotational nacelle 124 can be a strategic asset because a long rotating cylinder can provide inertial stability in pitch and yaw planes, which may be useful for UAV's such as the UAV 1400A (FIG. 14), e.g., for stability in image gathering in a presence of wind gusts on a light-weight UAV. Coupling the rotational nacelle 124 to a thrust-producing row of airfoils such as the forward fan blade 112 eliminates a gap between the forward fan blade 112 and the rotating nacelle 124. Tip clearance or gaps in turbofans produce a measurable reduction in engine efficiency and are a source of noise in turbofans.

Additionally, by mounting the propulsion system 100 at an aft end of the fuselage 130, the aft-fuselage closeout 130 can be treated with acoustic absorbing foam such as the acoustic foam/lining 136. As explained above in the context of FIG. 5, the acoustic foam/lining 136 can serve to substantially eliminate any residual forward radiated acoustic energy such as the acoustic radiation 506 which could bounce off of the tubular structure/fuselage 102 in a direction detectible by humans, animals, electronics, or other listening devices. For anticipated frequencies, integrating a thin (e.g., about 3-5 mm) layer of the acoustic foam/lining 136 which is a bulk absorber (broad spectral coverage) into the aft-fuselage closeout 130 may be sufficient for very short wavelengths and a corresponding modal structure. The acoustic foam/lining 136 could be installed into a manufactured recess in the aft-fuselage closeout 130.

The inlet lip 132 area to the rotating nacelle 124 may comprise an area for a cylindrical inlet of a full-frontal wind facing engine. However, fan disc/blades of ducted fan engines face an annular stream tube since free-stream air forms an annulus as it passes around either a gas-generator if gas turbine driven or a drive motor if driven by an electric motor.

The acoustic foam/lining 136 over the lower (and portions of the upper) hemisphere (FIGS. 5-8) of the aft-fuselage closeout 130 affords a capability of ensuring that any residual acoustic energy audible or perceptible to living people/animals or sophisticated measurement devices is absorbed upon impact prior to being reflected to far field and observers. Bulk absorbing material able to attenuate sound reflecting up to e.g., about 20 kHz (e.g., beyond critical frequencies that are easily attenuated by the atmosphere) is available. In an embodiment, the acoustic absorbing material of the acoustic foam/lining 136 is applied in an angular extent.

For a typical revolution per minute (RPM) of engines in a thrust class and an engine scale of a small UAV, a blade choice of 5×3 may be optimum as this ensures negation of any excessive energy in any particular acoustic band of risk from either a blade pass frequency. Harmonic or interaction frequency when an engine is operating at lower RPM's where acoustic observation is a risk. Differential fan disc speed can vary due to a need to provide assurance in avoiding any unwanted acoustic energy radiation. Plug regions such as the conical closeout plug acoustic arrester 1202 and interstage hub regions such as an interstage hub region 802 between the forward fan hub 110 and the aft fan hub 120 can be built from or treated with acoustic foam.

The acoustic foam/lining 136 extends far enough forward to a point 804 where the aft-fuselage closeout 130 begins, or where the tubular structure/fuselage 102 becomes constant area. For engine scales where a blade pass frequency results in a blade RPM producing sound at a frequency outside of human or animal acoustic observability, a ratio of the forward fan blade 112 to the aft fan blade 122 of 1:1 may be preferred as this may provide maximum performance.

UAV operations may not necessitate bank angles greater than 30-40 degrees in a turning orbit over a threat. Accordingly, extending the acoustic foam/lining 136 above about zero and about 180 degree planes 608 to a same angular amount a vehicle anticipates banking may prevent bounces of the acoustic radiation 506 (e.g., deadened rays 504 in FIG. 5) from reaching a ground level. In this manner, if an aircraft/vehicle banks about 30 degrees at most over a surveillance target, the acoustic foam/lining 136 may be extended a same angular increment (30) above, for example, about 0 or about 180 degrees. An entire circumference of the aft-fuselage closeout 130 may be acoustically treated, if manufacturing costs are lower for a continuous band of treatment. Acoustically treating the entire circumference of the aft-fuselage closeout 130 may not be necessary for acoustic observability, unless, e.g., a vehicle is to be operated in an inverted configuration.

Figure 9:
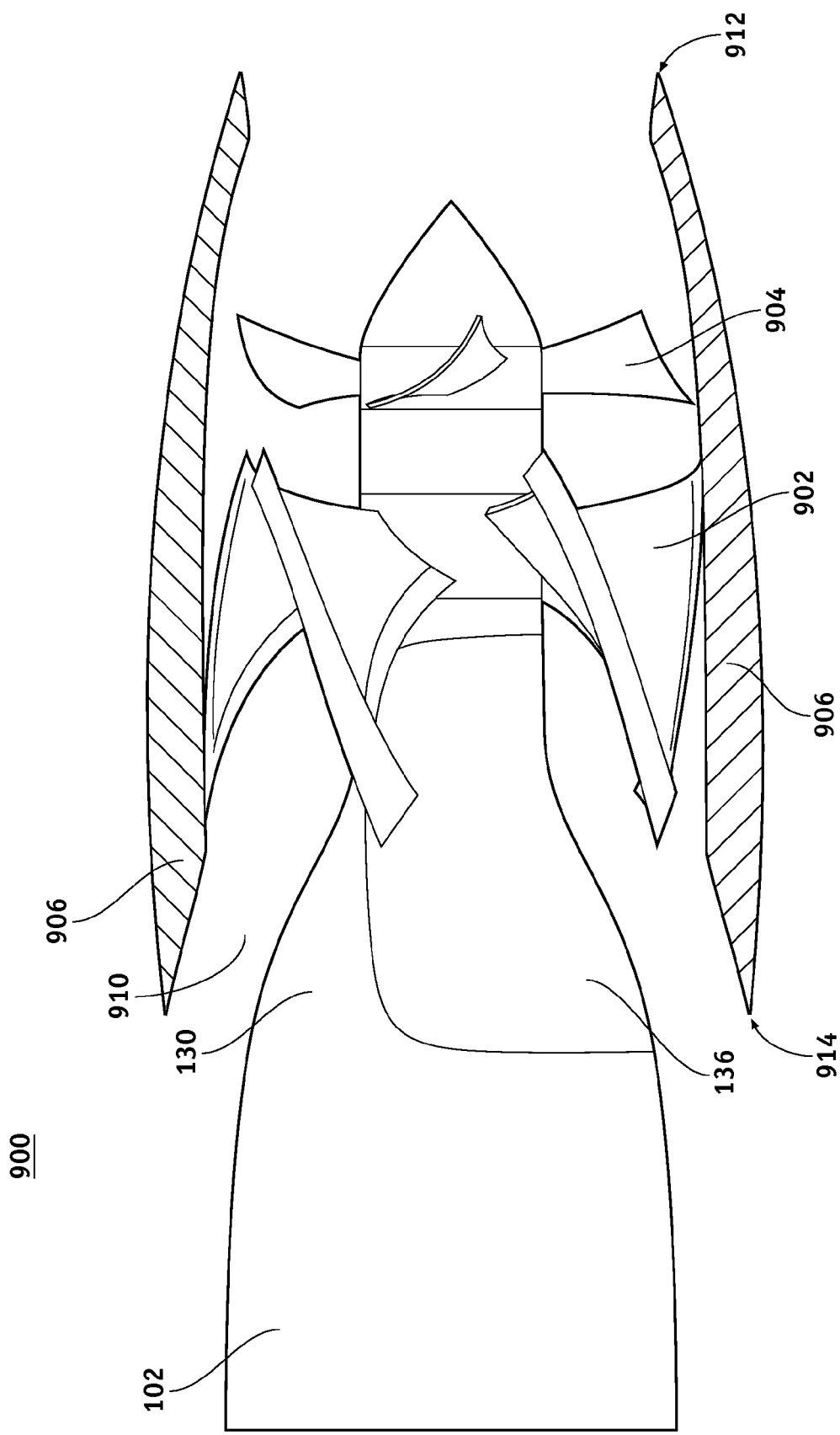
FIG. 9 is an illustration of a cross sectional view of an exemplary supersonic rotational annular airscrew with integrated conical acoustic arrester showing according to an embodiment of the disclosure.

FIG. 9 is an illustration of a cross sectional view of an exemplary supersonic rotational annular airscrew with integrated acoustic arrester 136 (propulsion system 900) according to an embodiment of the disclosure. Efficient supersonic flight, even at low to moderate supersonic flight may be a highly attractive enabler for small vehicles with specialized mission requirements. For example, a rotational nacelle is not limited to but may be a fixed geometry, and flight up to Mach 1.2 or slightly beyond can be facilitated with an external compression inlet 910 and a fixed convergent-divergent nozzle with a nozzle exit 912. Incorporation of these features into an integrated propulsive fan such as the forward fan 108 and the aft fan 118 and a rotational nacelle 906 behind the substantially tubular structure 102 may open market opportunities. A relative rotational speed of the rotational nacelle 906 to forward flight and internal air speeds anticipated for smaller size vehicles may result in the rotational nacelle 906 not imparting a discernible momentum on airflow.

Some distinguishing features of the embodiment shown in FIG. 9 are fan stage blades 902/904 configured to create higher fan pressure ratios necessary for high speed flight. For example, the blades 902/904 that may have greater chord and twist than subsonic blades, so the fan blade tip chord length 202 (FIG. 3) of the blades 902/904 may be, without limitation, as much as 2.5 times (or more) of the root chord 302. There may also be a higher number of blades and a spacing between the blades 902/904 may be reduced. In addition, the conical closeout plug acoustic arrester 1202 may generally be sharper and terminate prior to a region of a nozzle throat.

Furthermore, a presence of a convergent-divergent nozzle is achieved by configuring a throat near the nozzle exit 912 of the rotational nacelle 906 for supersonic/choked flow. For a vehicle such as a UAV 1400A (FIG. 14A) or a transport aircraft 1500 (FIG. 15) to fly supersonic, a velocity of airflow from the propulsion system 900 is supersonic, which requires a convergent-divergent section (nozzle/throat) so that a plume can substantially ideally expand after accelerating past Mach 1. Otherwise, airflow from the propulsion system 900 can over or under-expand resulting in loss of propulsive efficiency and also creating stress on the rotational nacelle 906 and the nozzle exit 912 due to shock-cells. For example, for Mach 1.2, a 6-10% convergent-divergent ratio may be preferred depending on design factors, where a convergent-divergent ratio in simplified form is about 1-(Dthroat/Dexit) and a ratio percentage is about 100%×(1-Dthroat/Dexit).

For a fixed geometry nozzle such as the rotational nacelle 906, supersonic flight may be limited to Mach 1.2. Above Mach 1.2, the rotational nacelle 906 may be configured with a variable geometry nozzle exit (e.g., contracting) using, for example, shape memory alloys. An inlet lip 914 of the rotational nacelle 906 may be sharper/less blunt than the inlet lip 132 of the rotational nacelle 124.

Figure 10:
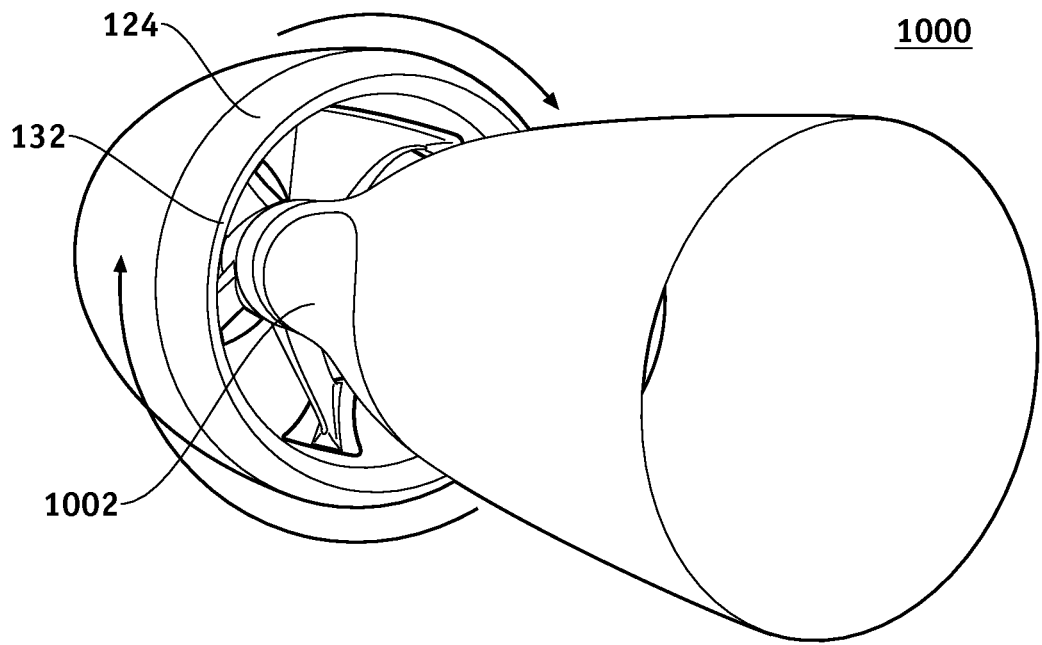
FIG. 10 is an illustration of a backward facing isometric view of an exemplary rotational annular airscrew with integrated conical acoustic arrester showing fan blades and a rotational nacelle assembly comprising an annular inlet according to an embodiment of the disclosure.

FIG. 10 is an illustration of a backward facing isometric view 1000 of the exemplary propulsion system 100 showing an assembly comprising the forward fan blades 112 and the rotational nacelle 124, and comprising the annular inlet 132 according to an embodiment of the disclosure.

Figure 11:
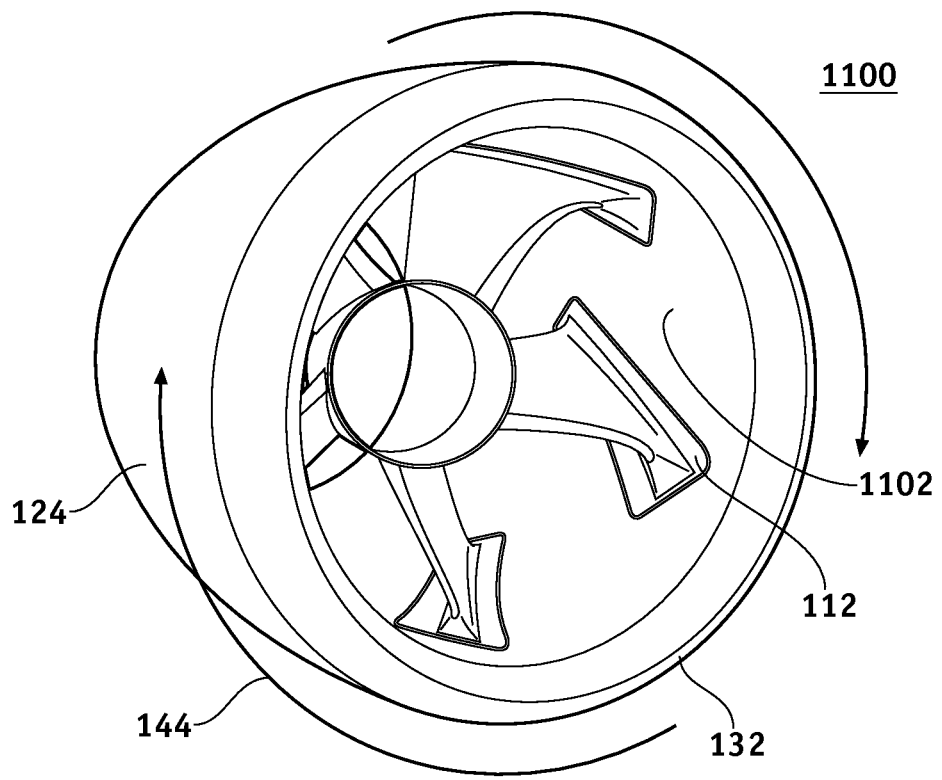
FIG. 11 is an illustration of a backward facing isometric view of an exemplary integrated forward fan and a rotational nacelle according to an embodiment of the disclosure.

FIG. 11 is an illustration of a backward facing isometric view 1100 of the exemplary (integrated) forward fan blade 112 and the rotational nacelle 124 according to an embodiment of the disclosure. The rotational nacelle 124 comprising acoustically absorbent material is affixed to the forward fan blades 112. In some embodiments, combinations of motor, propulsor and vehicle can result in sufficiently high RPM's that acoustic absorbing material is not necessary. In such a case (as mentioned above) in some embodiments, the forward fan blades 112 and the rotational nacelle 124 may comprise a continuous part made, for example, by rapid prototyping material or 3D printing.

Figure 12:
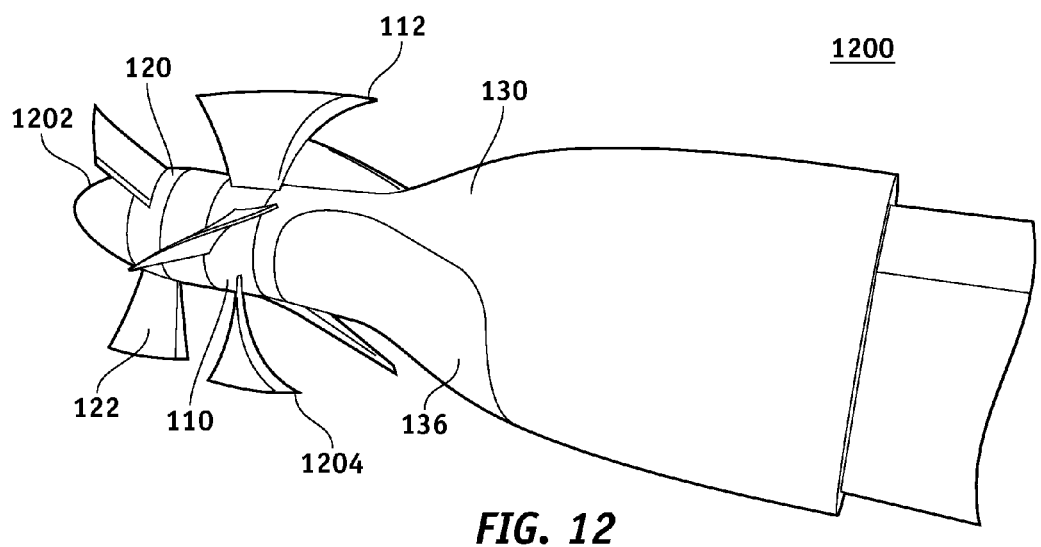
FIG. 12 is an illustration of an exemplary perspective view of an exemplary rotational annular airscrew with integrated conical acoustic arrester showing a rotational nacelle removed to illustrate fans, hubs, and an acoustic cover according to an embodiment of the disclosure.

FIG. 12 is an illustration of the exemplary perspective view of the exemplary propulsion system 100 showing the rotational nacelle 124 removed to illustrate the forward fan blades 112, the aft fan blades 122, the forward fan hub 110 and the aft fan hub 120, and the acoustic cover 136 according to an embodiment of the disclosure. In the embodiment shown in FIG. 12, contra-rotating shafts (not shown) may extend through the aft-fuselage closeout 130 where the forward fan blades 112 are integrated (coupled/affixed) with the rotational nacelle 124 that rotates with the rotational nacelle 124. The aft fan blades 122 rotate in a direction opposite to the forward fan blades 112 within the rotating shroud.

In an embodiment, the propulsion system 100 comprises five forward fan blades 112 and three aft fan blades 122. This combination avoids generation of plane-wave modes which are generated when a number of blades in each stage are equal or multiples of one another. This may be important under a specific combination of conditions whereby a vehicle operated at very low altitudes (e.g., under about 15 m (50 ft.)) and at very low power where plane waves radiating out of the back of a nacelle may not be attenuated by a duct. Plane waves radiating forward would impact an acoustic foam arrester on an aft body closeout and be attenuated/terminated (as mentioned above).

In an embodiment, a blade count ratio for missions where design rotational speeds during en-route transit and loiter are above 10,000 RPM may comprise 1:1 to ensure substantially optimum fan efficiency as plane waves at those frequencies are efficiently absorbed by the atmosphere.

Figure 13:
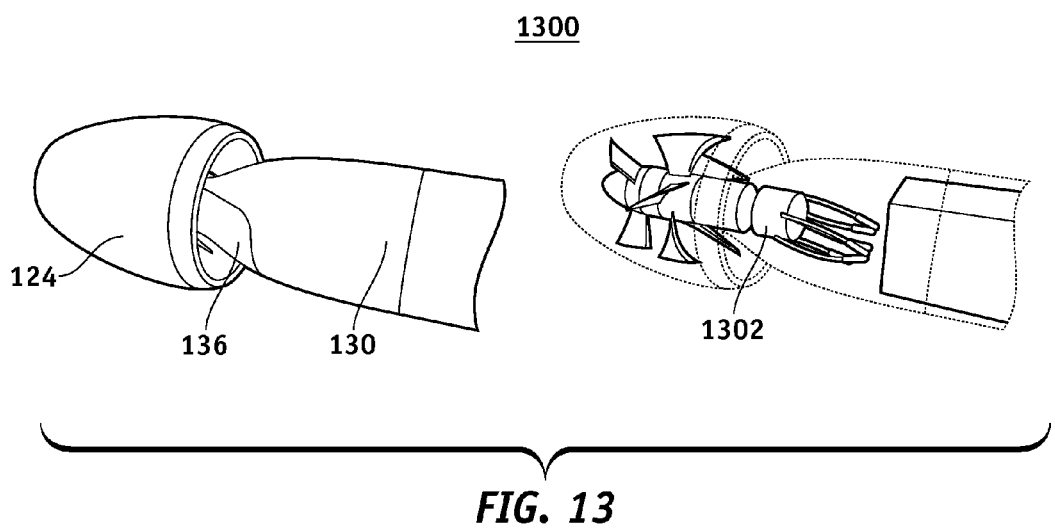
FIG. 13 is an illustration of an exemplary perspective view of an exemplary rotational annular airscrew with integrated conical acoustic arrester showing contra-rotational electrical motors according to an embodiment of the disclosure.

FIG. 13 is an illustration of the exemplary perspective view of the exemplary propulsion system 100 showing contra-rotating electrical motors 1302 according to an embodiment of the disclosure.

Figure 14A:
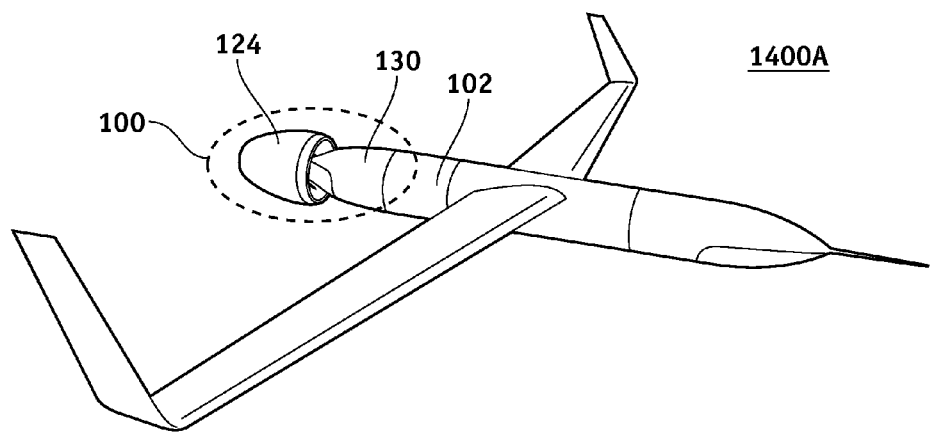
FIG. 14A is an illustration of an exemplary perspective view of an exemplary Unmanned Arial Vehicle (UAV) with a rotational annular airscrew with integrated conical acoustic arrester implemented thereon according to an embodiment of the disclosure.

FIG. 14A is an illustration of an exemplary perspective view of an Unmanned Arial Vehicle (UAV) 1400A with the propulsion system 100 implemented thereon according to an embodiment of the disclosure. In one embodiment, the propulsion system 100 capable of providing contra-rotation torque is located in an aft most section of a tubular fuselage of a UAV. The inlet lip 132 to the rotational nacelle 124 coupled/affixed to the forward fan blades 112 comprises an annulus forward of the inlet lip 132 (annular forward inlet 132). A conical acoustic arrester such as the acoustic foam 136 is installed on the substantially conical close-out end 130. The Unmanned Arial Vehicle (UAV) 1400A may comprise, for example but without limitation, aluminum, plastics, other suitable lightweight structural material.

Figure 14B:
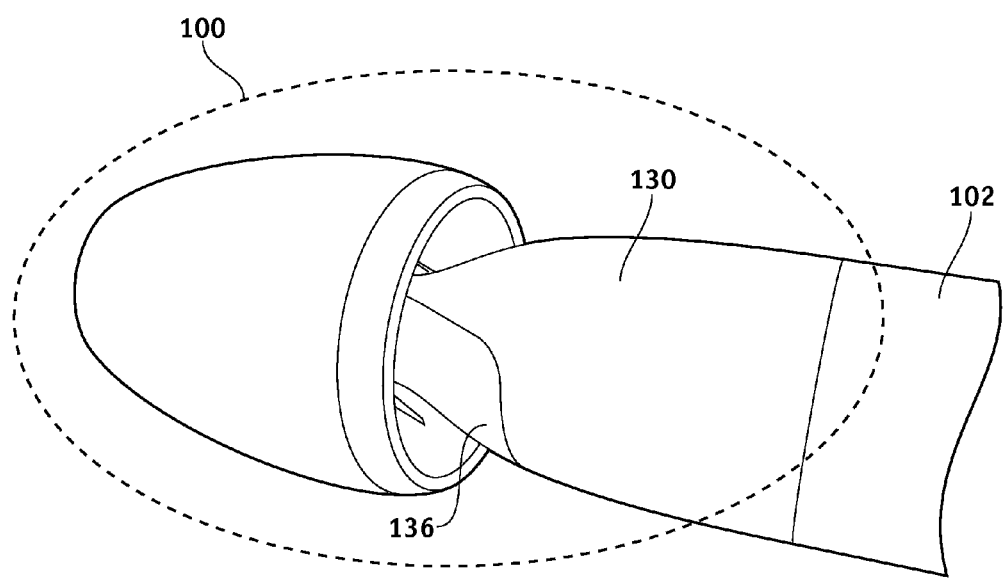
FIG. 14B is an illustration of an exemplary enlarged perspective view of the exemplary rotational annular airscrew with integrated conical acoustic arrester that can be used with the UAV of FIG. 14A, or with any other aircraft such as a commercial transport aircraft of FIG. 15 according to an embodiment of the disclosure.

FIG. 14B is an illustration of an exemplary enlarged perspective view of the propulsion system 100 that can be used with the UAV 1400A of FIG. 14A, or with any other aircraft such as a commercial transport aircraft as shown below in FIG. 15.

Figure 15:
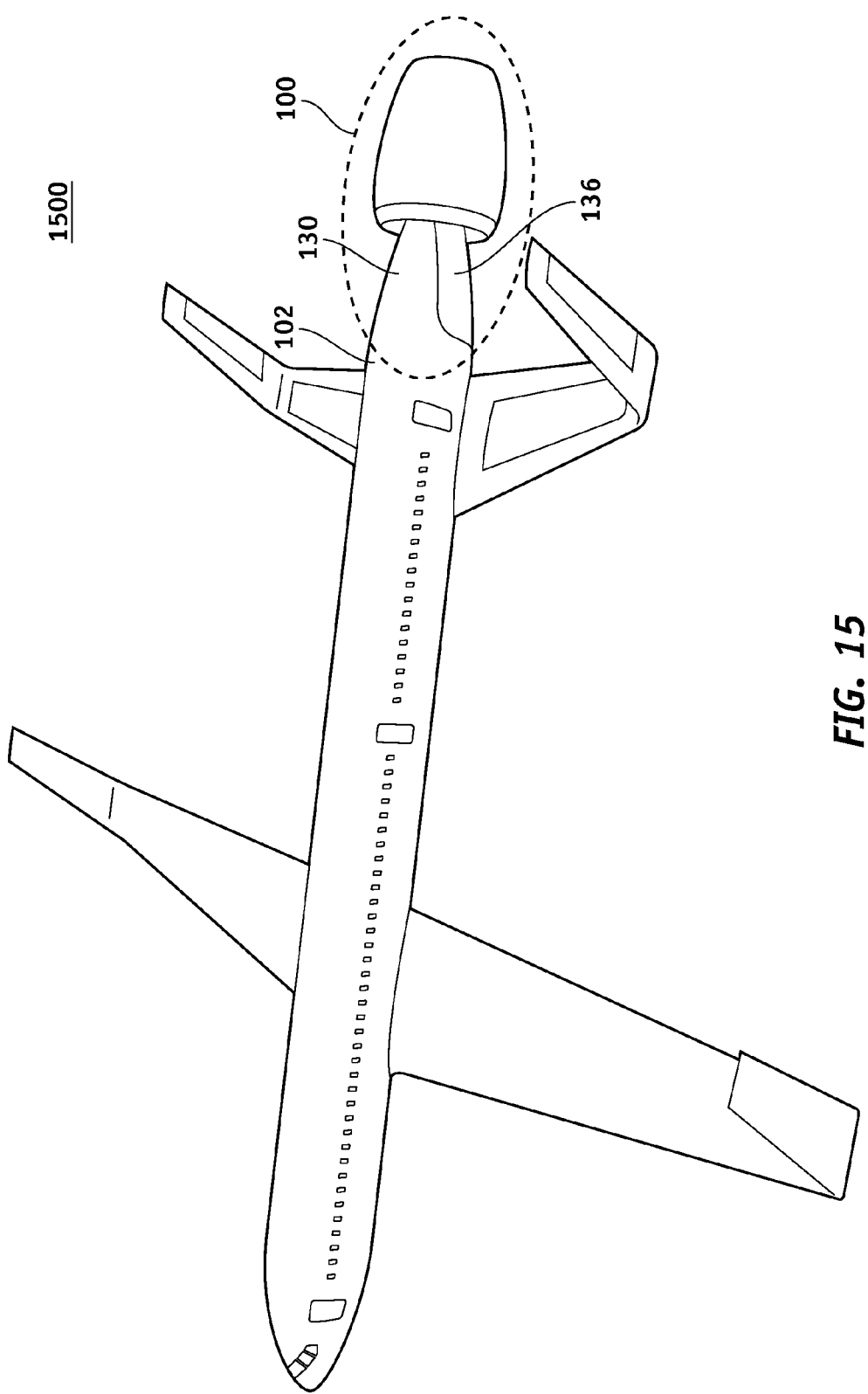
FIG. 15 is an illustration of an exemplary perspective view of an exemplary commercial transport aircraft with the rotational annular airscrew with integrated conical acoustic arrester implemented thereon according to an embodiment of the disclosure.

FIG. 15 is an illustration of an exemplary perspective view of the exemplary transport aircraft 1500 with the propulsion system 100 implemented thereon according to an embodiment of the disclosure. Air Vehicles have long been comprised of a tubular payload carrying structure as these were a most structurally efficient volume to pressurize. Even as airplane design has evolved, substantially tubular structures are still prevalent in air vehicles that do not require pressurization such as in some UAVs. Accordingly, many non-blended wing body (non-BWB) vehicles comprise a mostly tubular payload carrying structure, which can be elliptical, slightly triangular, or even partially rectangular. Generally, a cross section of payload carrying structure typically converges or contracts to a point at a termination to optimize a fineness ratio for minimum vehicle drag. A gradual contraction of a fuselage is known as a fuselage closeout. Mounting the propulsion system 100 behind structures of these shapes is desirable because of an alignment of thrust and drag vectors.

In the existing systems, an inlet may be greatly lengthened and placed on top of a fuselage with an S-duct, or an engine may be placed on a pylon above a fuselage (e.g., a DC-10). Common approaches to integrating an engine into a single engine air vehicle involve mounting an engine behind a tubular structure as in the case of some center engine aircraft. This aligns a thrust vector substantially with a net airplane drag vector. However, center mounting has traditionally required an s-shaped or serpentine inlet with an offset opening mounted above or to a side of a fuselage that turns the inlet flow into an engine face. Existing inlets generally result in reduced engine efficiency relative to a fully axial performance optimized inlet because the inlet is longer producing more internal scrubbing drag and reduced inlet recovery. These common inlets also turn flow, which further hinders inlet recovery due to flow separation and can also produce distortion which adversely affects engine performance and life. For example, large diameter fans may use beefed up fan blades that are also heavier. Existing inlets also add weight and wetted area drag to the air vehicle.

Integrating a ducted fan engine into a single engine air-vehicle efficiently has been elusive. Traditional engine mounting concepts utilizing under-wing mounted pylons are generally only practical when having more than one engine. Mounting a single ducted fan engine on top of a fuselage with a pylon as in the case of a center engine in some aircraft can result in excessive trim drag due to the forward pitching moment produced by a high thrust line. While this forward pitching moment can favorably offset rearward pitching moment produced by the wing, such as balance can be difficult to achieve.

In contrast, the transport aircraft 1500 with the propulsion system 100 provides centerline thrust, substantially reducing or eliminating pitching movements from thrush changes.

Figure 16:
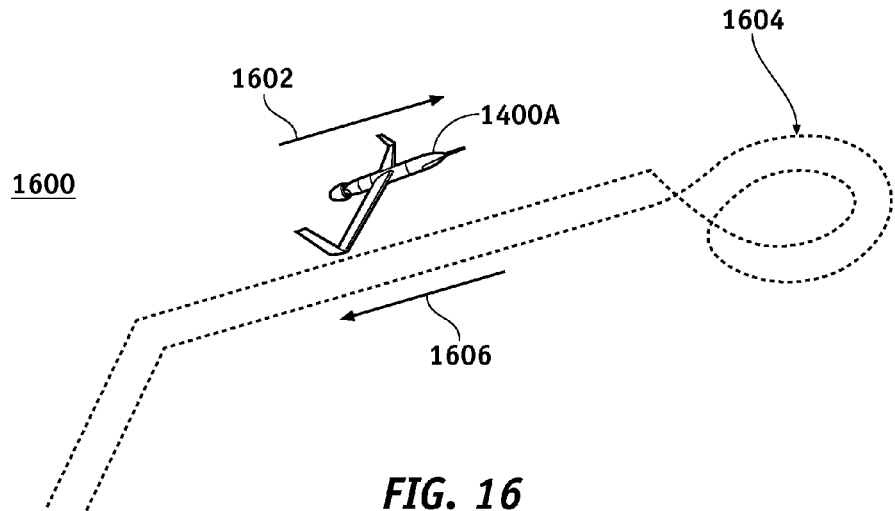
FIG. 16 is an illustration of an exemplary mission profile of an exemplary rotational annular airscrew with integrated conical acoustic arrester according to an embodiment of the disclosure.

FIG. 16 is an illustration of an exemplary mission profile 1600 of the propulsion system 100 according to an embodiment of the disclosure. As mentioned above, embodiments of the disclosure may comprise contra-rotating ducted fan thrust producing modules such as the aft fan 118 and the forward fan 108. A greater efficiency at some fan pressure ratios provide an ability to tailor individual relative fan disc/blade speeds for mission needs when driven by electric motors such as the contra-rotating forward coaxial electric motor 126 and the contra-rotating aft coaxial electric motor 128. Such operational profiles may be infeasible with a common gas generator combustion based turbofan.

The mission profile 1600 reflects usage of an optimum cycle through a continually tailored relative contra rotation fan speed. Usage of a fully controllable contra fan also enables thrust reversal by operating engines in a reversed direction. For example, the contra-rotating forward coaxial electric motor 126 and the contra-rotating aft coaxial electric motor 128 may be reversed. Thrust reversal by operating engines in a reversed direction may be used for, for example but without limitation, a rapid descent to capture, a quick vehicle landing for refueling and re-deployment, or other operation.

Segment 1602 of the mission profile 1600 shows a high-speed (e.g., about 100 knots) transit to a target with a full power propulsion system 100 comprising the contra-rotating forward fan 108 and the aft fan 118. Segment 1604 of the mission profile 1600 shows a quiet lower orbit speed (e.g., about 60 knots) using single rotation or partial contra-rotation based on an optimum operation. Segment 1606 of the mission profile 1600 shows an optimum relative contra fan speed for desired return to land speed or energy conservation (e.g., whichever is of greater need).

For a ducted fan diameter such as a diameter of the rotating nacelle 124, a multi-stage contra rotation fan such as the propulsion system 100 generally draws more corrected airflow per unit area than a single rotation fan. The multi-stage contra rotation fan such as the propulsion system 100 is also generally more efficient due to elimination of swirl produced by the upstream/forward fan 108. This is in contrast to single stage fans that use of a row of fixed stators to straighten flow but which do not contribute to thrust generation. In the propulsion system 100, however, the swirl created by the forward/upstream fan 108 (or first fan 108) is converted into thrust by the aft/downstream fan 118 (or second fan 118).

A greater airflow of the propulsion system 100 also allows a smaller propulsor diameter than a pure single rotation fan, thereby minimizing propulsor frontal area for observability, and concentrating a greater degree of acoustic energy on the acoustic foam 136 of the aft-fuselage closeout 130.

For example, a propeller may produce about 1 kg (2 lb) of cruise thrust with an about 41 cm (16 inch) diameter. In designing for a same thrust, a single rotation ducted fan would be about 30 cm (12 inches) due to higher fan pressure ratio, and a contra rotation ducted fan about 25 cm (10 inches) due to an even higher fan pressure ratio which is three inches wider than a fuselage diameter of about 18 cm (7 inches).

Current UAV's in an about 20 kg take-off weight range size can require roughly 1 kW of electric power to produce a same thrust as existing internal combustion engines. Commercially available electric contra-rotating ducted motors of the 1 Kw class may comprise substantially maximum rotational speeds in an about 10,000 rpm range, wherein substantially all acoustic energy produced at a blade pass frequency (BPF) and higher may be inaudible to humans at max power. Certain animals may still be able to detect a sound if the vehicle is at low enough altitude, however, so the acoustic foam/lining 136 on the aft-fuselage closeout 130 and within the rotational nacelle 124 is still an asset. Assuming next generation UAV's are able to more greatly utilize ultra-lightweight composites, a power requirement of a propulsor could be reduced, enabling use of higher RPM motors. For example; commercially available contra motors of a 440 W class have maximum speeds approaching 20,000 RPM, which would be beyond an audible range of humans and most animals.

Some embodiments of the disclosure comprise two independent motors, and one of the two independent motors can be temporarily stopped, thereby reducing the propulsion system 100 effectively to a single rotation fan system as a formerly rotating fan disc can act as a stator, thereby effectively enabling a variable cycle engine. For a UAV, having an engine that can operate at peak efficiency at two different specific thrusts enables a true multi-mode operation capability. For example, a high specific thrust mode with full contra rotation thrust for high speed transit, and a lower specific thrust mode with single rotation thrust for lower speed loiter.

Depending on a mission, a ratio of transit time to loiter time can be, for example, roughly equivalent or biased heavily toward loiter, however mission requirements are always evolving, with increased demand for vehicles that can get to distant destinations quickly. For missions where a destination is far from a launch site, current designs can take an inordinate amount of time getting to the destination when optimized for loiter performance. Either way, choosing a proper point design (e.g., loiter vs. transit) or proper degree of sub-optimizing can be complicated without a multi-mode capability. Changes may be made to a UAV wing to augment a multi-mode motor. For example, for high speed differentials, a low complexity variable sweep wing can be used. An ability to toggle between modes/engine cycles such as a higher specific thrust option can also facilitate an 'evasive' mode should a UAV need to elude detection or targeting.

Single rotation fan systems can be quieter than an equivalent contra rotation system. Thus, an ability to stop a fan disc temporarily to act as a stator can be a means to operate in "ultra-quiet" mode because contra rotation fans can be more noisy than single rotation fan systems. For example, for civilian UAV's where a target or delivery zone might be in an especially noise sensitive location but high speed transit to destination over less noise sensitive areas is still desirable. Relative noise characteristics of a contra rotation fan system are a complex combination of operating parameters, blade designs and other factors. Thus, in some embodiments, stopping one stage to operate as a single rotation fan to save noise ultimately may not be necessary. Noise regulations for civil UAV's are still in development, however embodiments of the disclosure offer a powerful opportunity.

A flexibility of such an electric driven contra fan system is also such that one or both discs could be reversed thereby providing reverse thrust in a means that does not require complex, expensive and loss producing cascade or clamshell thrust reversing devices. For example, for UAV's, reverse thrust can be especially valuable if rapid descent is required, e.g., for grappling or net based capture systems. The multi-mode flexibility offers a highly valuable multi-mission capability than can comprise a range of contra rotation high pressure ratio, high-speed sprint-to-destination operation; single rotation, moderate pressure ratio/speed loiter operation, along with intermediate combinations aimed at facilitating specific noise, speed, or endurance requirements which in effect presents a unique equivalent to a variable cycle turbofan engine.

UAV's may operate at a variety of high or moderate speeds, however turbofan and propeller propulsion systems are generally point designed, and thus operating at partial power may result in efficiency loss for a given thrust. In embodiments of the disclosure where one fan disc of a contra-rotating fan disc is stopped to serve as a stator, a rotating disc speed can be retained near its peak operating efficiency speed thereby retaining an efficiency advantage.

Figure 17:
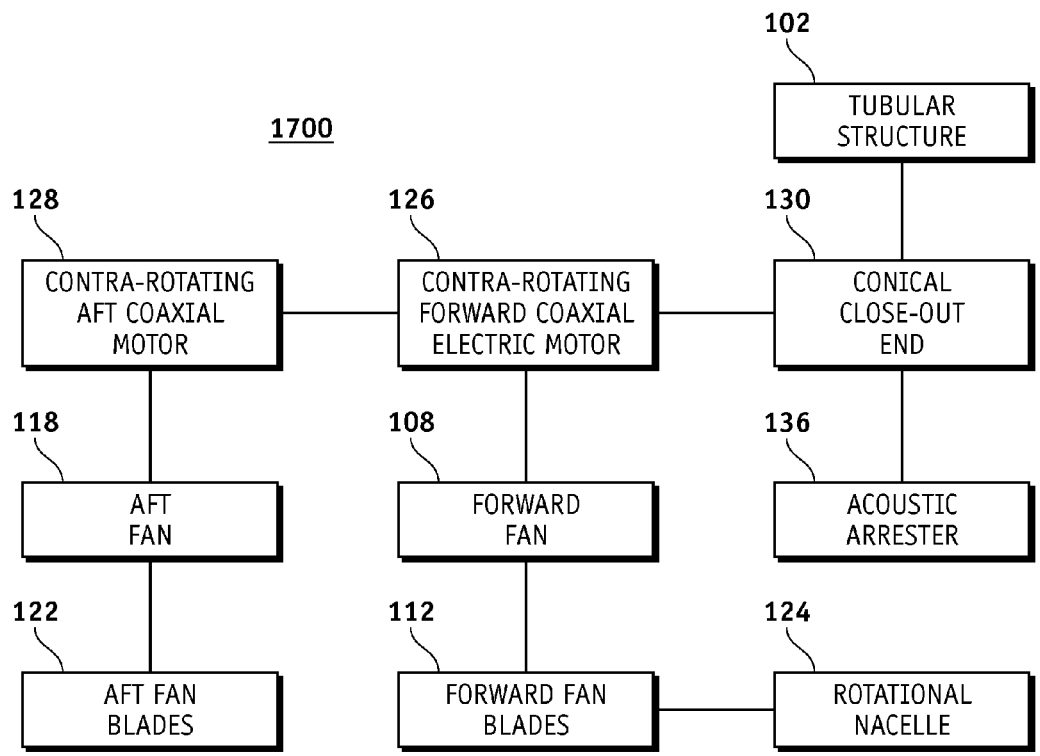
FIG. 17 is an illustration of an exemplary block diagram of an exemplary propulsion system according to an embodiment of the disclosure.

FIG. 17 is an illustration of an exemplary block diagram 1700 of the exemplary propulsion system 100/900 according to an embodiment of the disclosure. The propulsion system 100/900 may comprise, the aft fan 118, the aft fan blades 122, the forward fan 108, forward fan blades 112, the aft fan 118, the rotational nacelle 124/906 coupled to the forward fan blades 112 of the forward fan 108, the contra-rotating forward coaxial electric motor 126, the contra-rotating aft coaxial motor 128, and the substantially conical close-out end 130. While the prolusion system 100 is operable in subsonic speeds, the propulsion system 900 can operate in supersonic speeds as mentioned above.

The rotational nacelle 124 is fully circumscribing multiple rotating aft fan blades 122 and the forward fan blades 112 (fan blades 112/122) that provide inertial energy storage. The rotational nacelle 124 is not physically attached by pylons to an airplane fuselage or wing structure and comprises the acoustic foam/lining 136. The rotational nacelle 124 fully circumscribing multiple (rotating) fan blades 112/122 that provide improved airplane yaw and pitch stability.

The tubular structure/fuselage 102 with a substantially conical close-out 130, utilizing the acoustic lining 136 on a portion or all of the substantially conical close-out end 130 to prevent the acoustic radiation/rays 506 emanating forward from a ducted fan such as the forward fan 108 and the aft fan 118 from being reflected laterally or downward off of the substantially conical close-out end 130. As explained above in the context of discussion of FIG. 5 above, untreated acoustic rays 508 of the acoustic radiations 506 are deadened (attenuated) as shown by the deadened rays 504 (attenuated rays) upon impact with absorptive material of the acoustic lining 136 thereby noise is reduce.

In this manner, a combined use of acoustic arrester 136 and acoustically treated rotational nacelle 124 provides extensive noise reduction over propeller driven systems without need for high-torque propeller driven stability augmentation systems. Additionally, use of an electric contra-fan allows for higher cruise speeds while being quiet, multi-mode high efficiency en-route cruise in contra rotation mode, and high efficiency lower speed lower speed operation in single rotation mode.

Furthermore, combining fan blade 112 fixed to the rotational nacelle 124/906 provides efficiency benefits. For example, avoidance of fuselage or wing attachment hardware such as pylons/struts improved efficiency as pylons create inflow distortion and wake deficits that reduce fan performance and aggravate noise. Also, employment of an increased fan tip-chord through attachment to the rotational nacelle 124/906 enables higher propulsor efficiency by enabling more air to be pulled through the fan (e.g., the forward fan 108).

For another example, the propulsion system 100 does not require anti-torque provisions such as roll thrusters or highly oversized control surfaces found in single propulsion designs. Furthermore, the contra-rotation shrouded fan does not have to be closely coupled to the fuselage with struts or pylons which would add weight and aerodynamic interference that degrades propulsive efficiency.

Inertia provided by a long rotational nacelle such as the rotational nacelle 124/906 can also provide enhanced pitch and yaw stability, thereby reducing technical demands on the stability and control systems which would thereby provide an additional benefit for image stability and quality through smoother ride operation. Some incremental benefits from energy harvesting from a flywheel effect may also be gained, however those may be small.

Embodiments of the disclosure comprise two independent motors such as the contra-rotating forward coaxial electric motor 126 and the contra-rotating aft coaxial motor 128 where one stage that can be temporarily stopped, thereby reducing a system effectively to a single rotation fan system as a formerly rotating fan blade acts as a stator. Thereby, a variable cycle engine is enabled. For a UAV, having an engine that can operate at peak efficiency at two different specific thrusts enables a multi-mode operation capability. For example, a multi-mode operation capability may comprise a high specific thrust mode with full contra rotation thrust for high speed transit, and a lower specific thrust mode with single rotation thrust for lower speed loitering.

For a contra-rotating fan drive system such as the propulsion system 100 an integrated bladed disk-shroud (bladed disk nacelle) such as the rotational nacelle 124 couples to the forward fan blades 112 is optimally chosen to be a forward most stage or a wind-facing stage. When considering an optimal length of the rotational nacelle 124 for noise and performance, the center-of-gravity 402 (FIG. 4) of the rotational nacelle 124 is ideally located about a center-of-gravity of a forward wind-facing fan disc such as the forward fan 108. By co-locating these centers-of-gravity, a likelihood of balance and vibration induced stress that could reduce in-structural anomaly is minimized. Physical attachment of forward fan 108 stages to a nacelle facilitates a substantial increase in the fan-blade tip chord 202 of the forward fan 108, thereby enabling greater corrected airflow, thrust and efficiency.

Due to structural requirements necessary to avoid flutter, which is a mode where the forward fan blade 112 can vibrate at structural resonance and cause an anomaly, the fan-blade tip chord 202 (e.g., where a load is generally greatest) of legacy radial fan designs were a fraction of mid and root chord. Compound sweep or "high flow" fans comprise fan-blade tip chords substantially higher than a mid-chord of a fan pull a much greater volume of air per unit area through the fan.

For a forward most upstream or wind-facing fan blade stage such as the forward fan 112 operatively connected to the rotating nacelle 124, an opportunity to surpass current high flow fans is provided. By coupling of the forward fan 112 to the rotating nacelle 124, a tip fan-blade chord 202 (FIG. 2) can be increased to more than twice a mid-chord when structurally coupled to a nacelle such as the rotating nacelle 124. Thereby, flutter issues are substantially eliminated and a substantial increase in corrected airflow is enabled, and thus performance is improved. A preferred cross-sectional airfoil profile of a spinning/rotating nacelle 124 is generally dependent on a speed regime of a vehicle/aircraft and internal flow and can be via computation fluid dynamic optimization.

Embodiments of the disclosure provide a high performance ducted electric propulsion system such as the propulsion system 100 comprising one or more contra-rotating blades such as the aft fan blades 122 and the forward fan blades 112 integrated behind a tubular body such as the tubular structure 102. Conically tapered termination such as the conical close-out end 130 comprises an absorptive surface such as the acoustic arrester 136 capable of attenuating forward radiated sound such as the acoustic radiations 506 enabling a substantial acoustic detectability improvement compare to existing systems. UAV acoustic detectability at low altitudes is reduced by providing the propulsion systems 100 integrates behind the tubular structure 102. Application of a variable cycle electric engine in a UAV can tailor relative speeds of each fan 108/118 for maximum performance at various speeds. Tailoring relative speeds of the forward fan 108 and the aft fan 118 can also offer higher possible en-route speeds for a diameter of the propulsion systems 100 due to a higher specific thrust nature of contra-rotating fans 108/118. Time required to get a UAV on target can be reduced. The high performance ducted electric propulsion system 100 enables high-speed time-to-target with efficient quiet loitering through tailoring differential fan stage speed.

For smaller UAV's in an about 25 kg (50 lb) class, thrust requirements can be as low as about 1 kg (2 lbs), e.g., for launch assisted designs. For propulsors of this thrust class, additive manufacturing may be used to form single piece fan disc/shroud assemblies or bladed disk-shrouds that weigh only 10's of grams (ounces) depending on chosen material, thereby minimizing excessive rotational stress that could result in rotor burst when rotating at high speed. Margins of safety for plastic or polymer based bladed disk shrouds can be increased through encasing the rotational nacelle 124/906 with a thin film layer of high tensile material such as titanium, carbon-fiber-reinforced polymer/carbon-fiber-reinforced plastic (CRFP) or comparably strong material, which may weigh several grams (e.g., a fraction of an ounce).

In addition to additive manufacturing, molding technology such as molding for porous materials that may also serve as bulk-acoustic absorbers may be used. A bulk-absorbing material may be sufficient for the anticipated sound frequencies of the thrust producing components.

Figure 18:
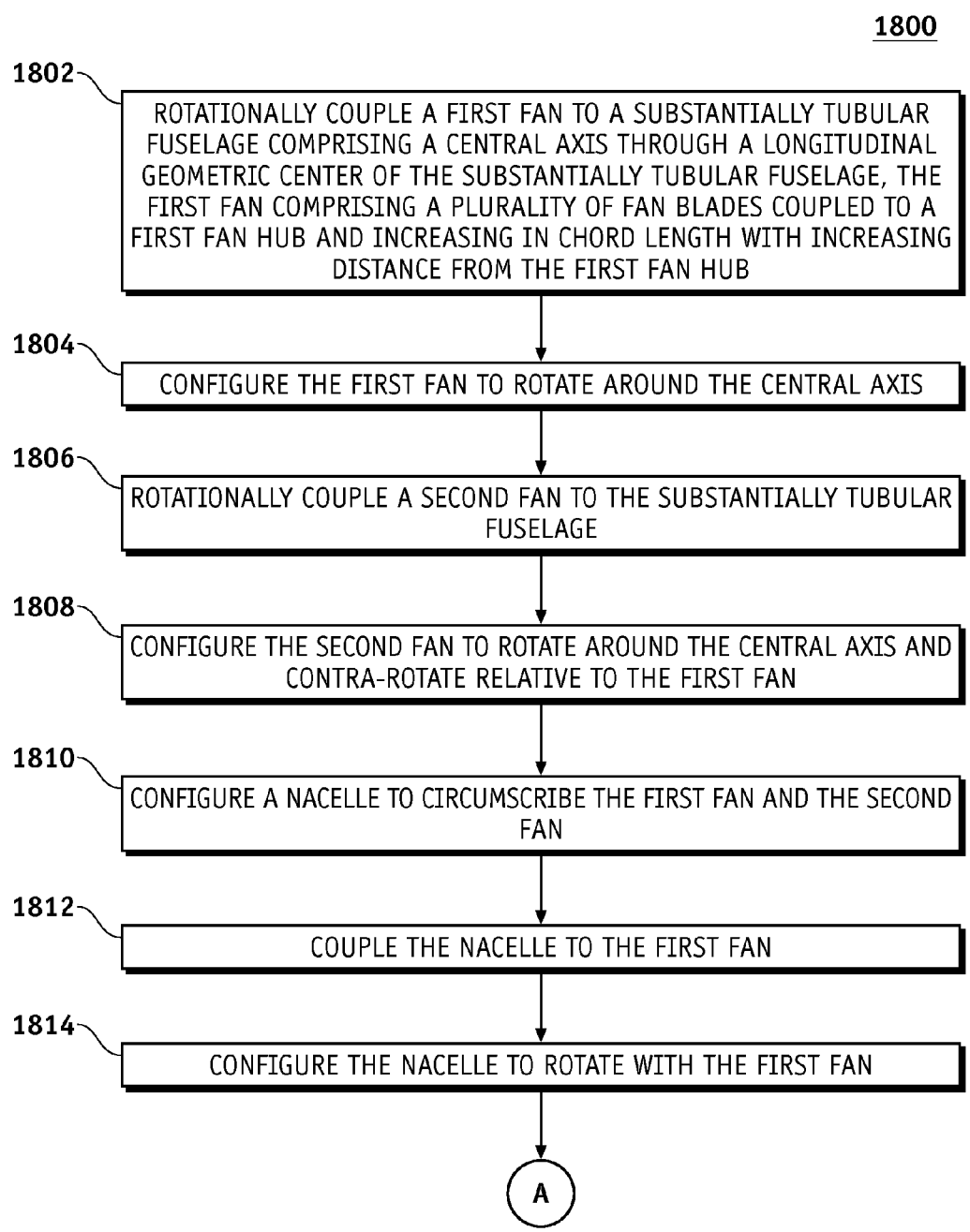
FIG. 18 is an illustration of an exemplary flowchart showing a process for configuring a propulsion system according to an embodiment of the disclosure.
Figure 18:
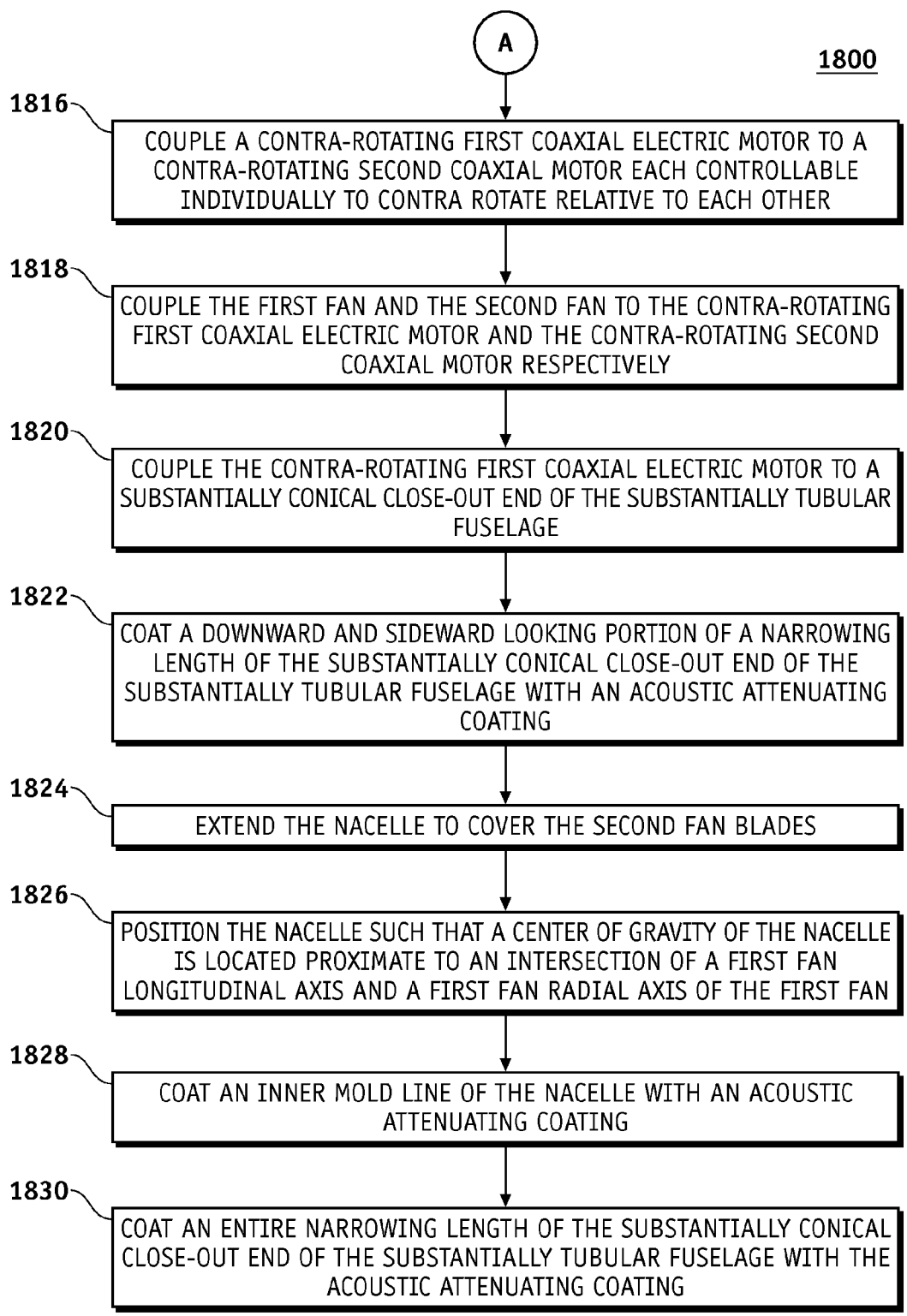

FIG. 18 is an illustration of an exemplary flowchart showing a process 1800 for configuring a propulsion system according to an embodiment of the disclosure. The various tasks performed in connection with process 1800 may be performed mechanically, by software, hardware, firmware, computer-readable software, computer readable storage medium, or any combination thereof. It should be appreciated that process 1800 may include any number of additional or alternative tasks, the tasks shown in FIG. 18 need not be performed in the illustrated order, and the process 1800 may be incorporated into a more comprehensive procedure or process having additional functionality not described in detail herein.

For illustrative purposes, the following description of process 1800 may refer to elements mentioned above in connection with FIGS. 1-17. In some embodiments, portions of the process 1800 may be performed by different elements of the system 100 such as: The forward fan hub 110, aft fan hub 120, the rotational nacelle 124, the forward fan blades 112, the aft fan blades 122, the contra-rotating forward coaxial electric motor 126, the contra-rotating aft coaxial motor 128, the substantially conical close-out end 130, etc. It should be appreciated that process 1800 may include any number of additional or alternative tasks, the tasks shown in FIG. 18 need not be performed in the illustrated order, and the process 1800 may be incorporated into a more comprehensive procedure or process having additional functionality not described in detail herein.

Process 1800 may begin by rotationally coupling a first fan such as the forward fan 108 to a substantially tubular fuselage such as the substantially tubular structure 102 comprising a central axis such as the central axis 104 through a longitudinal geometric center of the substantially tubular fuselage, the first fan comprising a plurality of fan blades such as the forward fan blades 112 coupled to a first fan hub such as the forward fan hub 110 and increasing in chord length such as the chord length 114 with increasing distance such as the distance 116 from the first fan hub (task 1802).

Process 1800 may continue by configuring the first fan to rotate around the central axis 104 (task 1804).

Process 1800 may continue by rotationally coupling a second fan such as the aft fan 118 to the substantially tubular fuselage 102 (task 1806).

Process 1800 may continue by configuring the second fan to rotate around the central axis 104 and contra-rotate relative to the first fan (task 1808).

Process 1800 may continue by configuring a nacelle such as the rotational nacelle 124/906 to circumscribe the first fan and the second fan (task 1810).

Process 1800 may continue by coupling the nacelle to the first fan (task 1812).

Process 1800 may continue by configuring the nacelle to rotate with the first fan (task 1814).

Process 1800 may continue by coupling a contra-rotating first coaxial electric motor such as the contra-rotating forward coaxial electric motor 126 to a contra-rotating second coaxial motor such as the contra-rotating aft coaxial electric motor 128 each controllable individually to contra rotate relative to each other (task 1816).

Process 1800 may continue by coupling the first fan and the second fan to the contra-rotating first coaxial electric motor and the contra-rotating second coaxial motor respectively (task 1818).

Process 1800 may continue by coupling the contra-rotating first coaxial electric motor to a substantially conical close-out end of the substantially tubular fuselage (task 1820).

Process 1800 may continue by coating a downward and sideward looking portion of a narrowing length of the substantially conical close-out end such as the substantially conical close-out end 130 of the substantially tubular fuselage 102 with an acoustic attenuating coating (task 1822).

Process 1800 may continue by extending the nacelle to cover the second fan blades (task 1824).

Process 1800 may continue by positioning the nacelle such that a center of gravity such as the center-of-gravity 402 of the nacelle is located proximate to an intersection of a first fan longitudinal axis such as the longitudinal axis 404 and a first fan radial axis such as the radial axis 406 of the first fan (task 1826).

Process 1800 may continue by coating an inner mold line such as the inner aerodynamic surface of the nacelle with an acoustic attenuating coating (task 1828).

Process 1800 may continue by coating an entire narrowing length of the substantially conical close-out end of the substantially tubular fuselage with the acoustic attenuating coating (task 1830).

Figure 19:
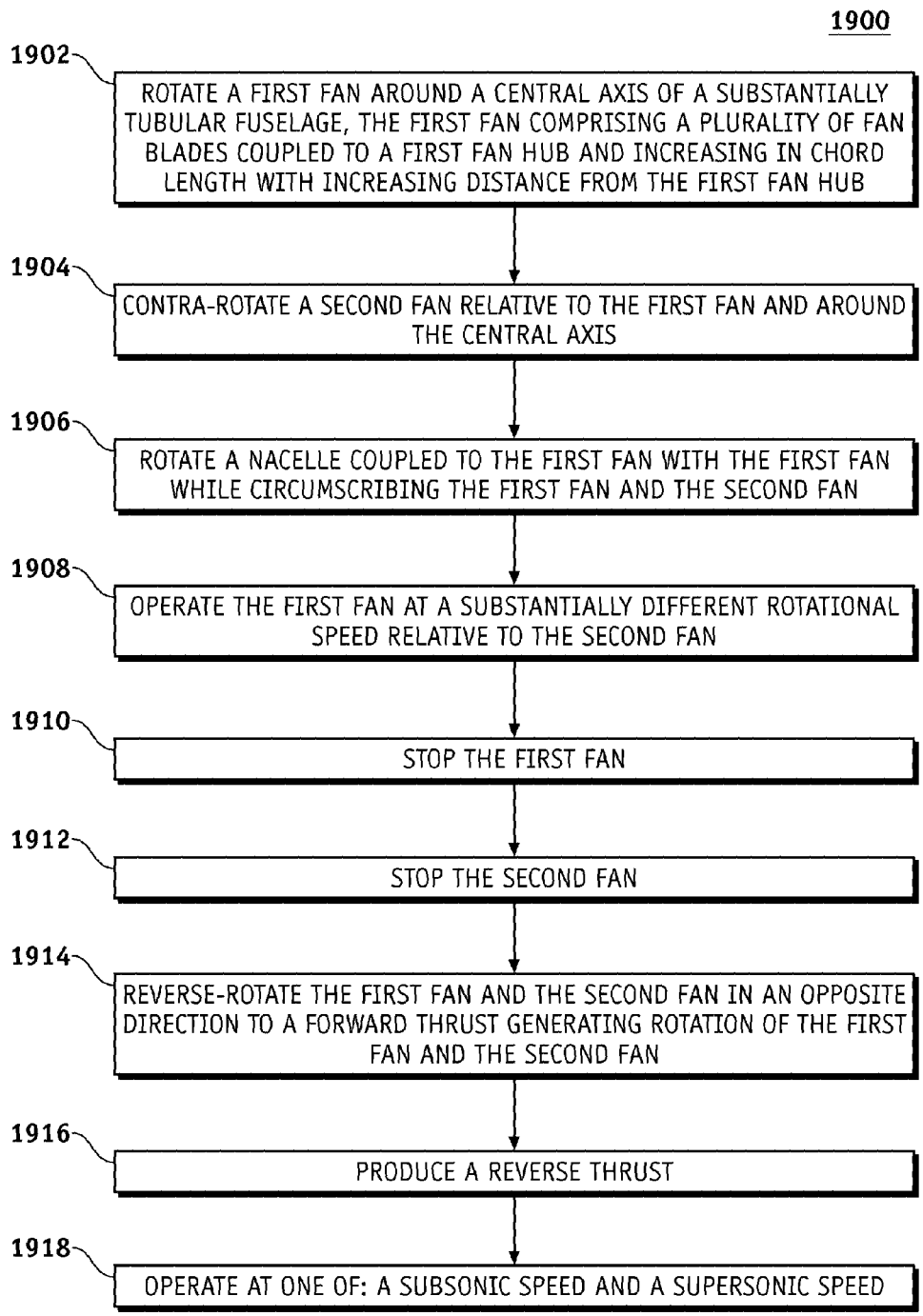
FIG. 19 is an illustration of an exemplary flowchart showing a process for operating a propulsion system according to an embodiment of the disclosure.

FIG. 19 is an illustration of an exemplary flowchart showing a process for operating a propulsion system according to an embodiment of the disclosure. The various tasks performed in connection with process 1900 may be performed mechanically, by software, hardware, firmware, computer-readable software, computer readable storage medium, or any combination thereof. It should be appreciated that process 1900 may include any number of additional or alternative tasks, the tasks shown in FIG. 19 need not be performed in the illustrated order, and the process 1900 may be incorporated into a more comprehensive procedure or process having additional functionality not described in detail herein.

For illustrative purposes, the following description of process 1800 may refer to elements mentioned above in connection with FIGS. 1-17. In some embodiments, portions of the process 1900 may be performed by different elements of the system 100 such as: The forward fan hub 110, aft fan hub 120, the rotational nacelle 124, the forward fan blades 112, the aft fan blades 122, the contra-rotating forward coaxial electric motor 126, the contra-rotating aft coaxial motor 128, the substantially conical close-out end 130, etc. It should be appreciated that process 1900 may include any number of additional or alternative tasks, the tasks shown in FIG. 19 need not be performed in the illustrated order, and the process 1900 may be incorporated into a more comprehensive procedure or process having additional functionality not described in detail herein.

The process 1900 may begin by rotating a first fan such as the forward fan 108 around a central axis such as the central axis 104 of a substantially tubular fuselage such as the substantially tubular structure 102, the first fan comprising a plurality of fan blades such as the forward fan blades 112 coupled to a first fan hub such as the forward fan hub 110 and increasing in chord length such as the chord length 114 with increasing distance such as the distance 116 from the first fan hub (task 1902).

The process 1900 may continue by contra-rotating a second fan such as the aft fan 118 relative to the first fan and around the central axis 104 (task 1904).

The process 1900 may continue by rotating a nacelle such as the rotational nacelle 124/906 coupled to the first fan with the first fan while circumscribing the first fan and the second fan (task 1906).

The process 1900 may continue by operating the first fan at a substantially different rotational speed relative to the second fan (task 1908). Substantially different rotational speed may mean a large difference in relative rotational speed (RPM).

The process 1900 may continue by stopping the first fan (task 1910).

The process 1900 may continue by stopping the second fan (task 1912).

The process 1900 may continue by reverse-rotating the first fan and the second fan in an opposite direction to a forward thrust generating rotation of the first fan and the second fan (task 1914). Reverse-rotating the first fan and the second fan may comprise operating the first fan and the second fan to rotate in an opposite direction to a thrust generating rotation of the first fan and the second fan. The forward thrust generating rotation may comprise a rotation wherein the first fan and the second fan generate a thrust to propel a vehicle in a forward direction.

The process 1900 may continue by producing a reverse thrust (task 1916). The reverse thrust may comprise a thrust in opposition to a forward motion of a vehicle.

The process 1900 may continue by operating at one of: a subsonic speed and a supersonic speed (task 1918).

Embodiments of the disclosure comprise an integrated propulsion system comprising a shape and juxtaposition of the fuselage that are not used in existing systems as any single engine scheme for commercial airliners is a non-starter due to engine out certification requirements. Embodiments of the disclosure further comprise a blended wide-chord fan-tip cowl attachment for structural integrity and an added performance benefit the wide-chord provides.

Although exemplary embodiments of the present disclosure have been described above with reference to the accompanying drawings, it is understood that the disclosure is not limited to the above-described embodiments. Various alterations and modifications to the above embodiments are contemplated to be within the scope of the disclosure. It should be understood that those alterations and modifications are included in the technical scope of the disclosure as defined by the appended claims.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way.

Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A propulsion system comprising:
   a substantially tubular structure comprising a central axis through a longitudinal geometric center;
   a first fan configured to rotate around the central axis and comprising:
      a first fan hub rotationally coupled to the substantially tubular structure; and
      a plurality of first fan blades coupled to the first fan hub and increasing in chord length with increasing distance from the first fan hub;
   a second fan configured to rotate around the central axis and contra-rotate relative to the first fan and comprising:
      a second fan hub rotationally coupled to the substantially tubular structure; and
      a plurality of second fan blades coupled to the second fan hub; and
   a nacelle circumscribing the first fan and the second fan, and coupled to and configured to rotate with the first fan,
   wherein the nacelle comprises an annular inlet and a cylindrical outlet.

2. The propulsion system of claim 1, further comprising:
   a contra-rotating first coaxial electric motor coupled to a contra-rotating second coaxial motor and operable to be controllable individually to contra rotate relative to each other;
   the first fan blades and the second fan blades coupled to the contra-rotating first coaxial electric motor and the contra-rotating second coaxial motor respectively; and
   a substantially conical close-out end of the substantially tubular structure coupled to the contra-rotating first coaxial electric motor.

3. The propulsion system of claim 1, further comprising a downward and sideward looking portion of a narrowing length of the substantially conical close-out end of the substantially tubular structure coated with an acoustic attenuating coating.

4. The propulsion system of claim 3, wherein acoustic energy that radiates forward from the nacelle to the substantially conical close-out end is attenuated by the acoustic attenuating coating.

5. The propulsion system of claim 1, wherein the substantially conical close-out end comprises an acoustic lining that circumscribes at least 180 degrees of a lower hemisphere of the substantially tubular structure.

6. The propulsion system of claim 5, wherein the acoustic lining circumscribes an additional angular increment above the lower hemisphere that corresponds to a substantially maximum anticipated bank angle.

7. The propulsion system of claim 1, wherein the substantially conical close-out end comprises acoustic lining that extends longitudinally forward to a point where a cross section of the substantially tubular structure is constant.

8. A propulsion system comprising:
   a substantially tubular structure comprising a central axis through a longitudinal geometric center;
   a first fan configured to rotate around the central axis and comprising:
      a first fan hub rotationally coupled to the substantially tubular structure; and
      a plurality of first fan blades coupled to the first fan hub and increasing in chord length with increasing distance from the first fan hub;
   a second fan configured to rotate around the central axis and contra-rotate relative to the first fan and comprising:
      a second fan hub rotationally coupled to the substantially tubular structure; and
      a plurality of second fan blades coupled to the second fan hub;
   a nacelle circumscribing the first fan and the second fan, and coupled to and configured to rotate with the first fan;
   a contra-rotating first coaxial electric motor coupled to a contra-rotating second coaxial motor and operable to be controllable individually to contra rotate relative to each other;
   the first fan blades and the second fan blades coupled to the contra-rotating first coaxial electric motor and the contra-rotating second coaxial motor respectively; and
   a substantially conical close-out end of the substantially tubular structure coupled to the contra-rotating first coaxial electric motor.

9. The propulsion system of claim 8, further comprising a downward and sideward looking portion of a narrowing length of the substantially conical close-out end of the substantially tubular structure coated with an acoustic attenuating coating.

10. The propulsion system of claim 9, wherein acoustic energy that radiates forward from the nacelle to the substantially conical close-out end is attenuated by the acoustic attenuating coating.

11. The propulsion system of claim 8, wherein the substantially conical close-out end comprises an acoustic lining that circumscribes at least 180 degrees of a lower hemisphere of the substantially tubular structure.

12. The propulsion system of claim 11, wherein the acoustic lining circumscribes an additional angular increment above the lower hemisphere that corresponds to a substantially maximum anticipated bank angle.

13. The propulsion system of claim 8, wherein the substantially conical close-out end comprises acoustic lining that extends longitudinally forward to a point where a cross section of the substantially tubular structure is constant.

14. The propulsion system of claim 8,
    wherein a portion of the nacelle is extended to cover the second fan blades and configured to contra-rotate relative to the second fan.

15. The propulsion system of claim 8, wherein the nacelle is positioned such that a center of gravity of the nacelle is located proximate to an intersection of a longitudinal axis and radial axis of the first fan blades.

16. The propulsion system of claim 8, wherein a first fan blade chord length of the first fan blades is about twice a length of a second fan blade chord length of the second fan blades.

17. The propulsion system of claim 8, wherein a fan-blade tip chord of the first fan blades is about 50% larger than a root chord of the first fan blades.

18. The propulsion system of claim 8, wherein an inner mold line of the nacelle is coated with an acoustic attenuating coating.

19. The propulsion system of claim 18, wherein an entire narrowing length of a substantially conical close-out end of the substantially tubular structure is coated with the acoustic attenuating coating.

20. The propulsion system of claim 8, wherein the first fan blades comprise five fan blades and the second fan blades comprise three fan blades.

21. The propulsion system of claim 8, wherein, to optimize performance and external noise at different flight speeds, the first fan is configured to switch between a fixed configuration and a rotating configuration.

22. The propulsion system of claim 8, wherein the nacelle comprises an annular forward inlet and a cylindrical outlet aft.

23. The propulsion system of claim 22, wherein a length of the nacelle is substantially twice the cylindrical outlet aft.

24. The propulsion system of claim 8, wherein the second fan comprises a radial axis perpendicular to a longitudinal axis that passes through a center of the second hub of the second fan.

25. The propulsion system of claim 8, wherein the substantially tubular structure comprises a fuselage of one of: a UAV, and a transport aircraft.

26. The propulsion system of claim 8, wherein the first fan comprises a first fan radial axis perpendicular to a first fan longitudinal axis that passes through a center of the first fan hub.

27. The propulsion system of claim 26, wherein a center of gravity of the nacelle is located within about 5 mm of an intersection of the first fan longitudinal axis and the first fan radial axis.

28. The propulsion system of claim 8, wherein the first fan hub and the nacelle are separated by a distance, and the chord length of the plurality of first fan blades increases over the entire distance between the first fan hub and the nacelle.

29. The propulsion system of claim 8, wherein the nacelle is not coupled to the second fan.

30. A method for configuring a propulsion system, the method comprising:
rotationally coupling a first fan to a substantially tubular fuselage comprising a central axis through a longitudinal geometric center of the substantially tubular fuselage, the first fan comprising a plurality of first fan blades coupled to a first fan hub and increasing in chord length with increasing distance from the first fan hub;
configuring the first fan to rotate around the central axis;
rotationally coupling a second fan to the substantially tubular fuselage;
configuring the second fan comprising second fan blades to rotate around the central axis and contra-rotate relative to the first fan;
configuring a nacelle to circumscribe the first fan and the second fan, wherein a portion of the nacelle is extended to cover the second fan blades;
coupling the nacelle to the first fan;
configuring the nacelle to rotate with the first fan, wherein configuring the nacelle to rotate with the first fan comprises configuring the portion of the nacelle to contra-rotate relative to the second fan;
coupling a contra-rotating first coaxial electric motor to a contra-rotating second coaxial motor each controllable individually to contra rotate relative to each other;
coupling the first fan and the second fan to the contra-rotating first coaxial electric motor and the contra-rotating second coaxial motor respectively; and
coupling the contra-rotating first coaxial electric motor to a substantially conical close-out end of the substantially tubular fuselage.

31. The method of claim 30, further comprising positioning the nacelle such that a center of gravity of the nacelle is located proximate to an intersection of a first fan longitudinal axis and a first fan radial axis of the first fan.

32. The method of claim 30, further comprising coating a downward and sideward looking portion of a narrowing length of the substantially conical close-out end of the substantially tubular fuselage with an acoustic attenuating coating.

33. The method of claim 30, wherein a first fan blade chord length of the first fan blades is about twice a length of a second fan blade chord length of the second fan blades.

34. The method of claim 30, wherein a fan-blade tip chord of the first fan blades is about 50% larger than a root chord of the first fan blades.

35. The method of claim 30, further comprising coating an inner mold line of the nacelle with an acoustic attenuating coating.

36. The method of claim 35, further comprising coating an entire narrowing length of a substantially conical close-out end of the substantially tubular fuselage with the acoustic attenuating coating.

37. The method of claim 30, wherein the substantially tubular fuselage comprises a fuselage of one of: a UAV and a transport aircraft.

* * * * *